(12) United States Patent
Harada et al.

(10) Patent No.: US 12,127,097 B2
(45) Date of Patent: Oct. 22, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 504 days.

(21) Appl. No.: 17/438,175

(22) PCT Filed: Mar. 12, 2019

(86) PCT No.: PCT/JP2019/010031
§ 371 (c)(1),
(2) Date: Sep. 10, 2021

(87) PCT Pub. No.: WO2020/183613
PCT Pub. Date: Sep. 17, 2020

(65) Prior Publication Data
US 2022/0150800 A1    May 12, 2022

(51) Int. Cl.
*H04W 48/08* (2009.01)
*H04L 5/00* (2006.01)
*H04W 72/0446* (2023.01)

(52) U.S. Cl.
CPC .......... *H04W 48/08* (2013.01); *H04L 5/0048* (2013.01); *H04W 72/0446* (2013.01)

(58) Field of Classification Search
None
See application file for complete search history.

(56) References Cited

U.S. PATENT DOCUMENTS

2020/0059927 A1* 2/2020 Sun ................... H04W 56/0015
2022/0086904 A1* 3/2022 Ko .................... H04W 56/0015

FOREIGN PATENT DOCUMENTS

KR        102397865 B1 *  5/2022

OTHER PUBLICATIONS

Ericsson; "Initial access signals and channels for NR-U"; 3GPP TSG-RAN WG1 Meeting #96, R1-1902880; Athens, Greece; Feb. 25-Mar. 1, 2019 (12 pages).
Charter Communications; "Feature lead summary #1 of Enhancements to initial access procedure"; 3GPP TSG RAN WG1 Meeting Ad Hoc 1901, R1-1901347; Taipei, Taiwan; Jan. 21-25, 2019 (13 pages).

(Continued)

*Primary Examiner* — Adolf Dsouza
(74) *Attorney, Agent, or Firm* — Osha Bergman Watanabe & Burton LLP

(57) ABSTRACT

A user terminal includes a reception section that receives a synchronization signal block including a synchronization signal and a broadcast channel at a frequency to which channel sensing before transmission is applied and a control section that determines at least one of a configuration of a first signal including the synchronization signal block and a downlink control channel and a downlink shared channel which are quasi co-located (QCL) with the synchronization signal block and a configuration of a second signal including the first signal in a specific period based on the synchronization signal block. According to one aspect of the present disclosure, appropriate communication can be performed in an unlicensed band.

7 Claims, 13 Drawing Sheets

SSB

CORESET

PDSCH

(56) References Cited

OTHER PUBLICATIONS

Office Action issued in Japanese Application No. 2021-504679 dated Mar. 28, 2023 (6 pages).
3GPP TSG RAN WG1 Meeting AH1901; R1-1901332 "Feature lead summery on initial access signals and channels for NR-U" Qualcomm Incorporated; Taipei, Taiwan; Jan. 21-25, 2019 (31 pages).
Extended European Search Report issued in European Application No. 19919384.8, dated Sep. 12, 2022 (9 pages).
International Search Report issued in PCT/JP2019/010031 on May 28, 2019 (1 page).
Written Opinion of the International Searching Authority issued in PCT/JP2019/010031 on May 28, 2019 (3 pages).
Huawei, HiSilicon; "Initial access in NR unlicensed"; 3GPP TSG RAN WG1 Meeting #96, R1-1901526; Athens, Greece; Feb. 25-Mar. 1, 2019 (13 pages).
Spreadtrum Communications; "Discussion on DRS in NR-U"; 3GPP TSG RAN WG1 Meeting #96, R1-1902736; Athens, Greece; Feb. 25-Mar. 1, 2019 (10 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

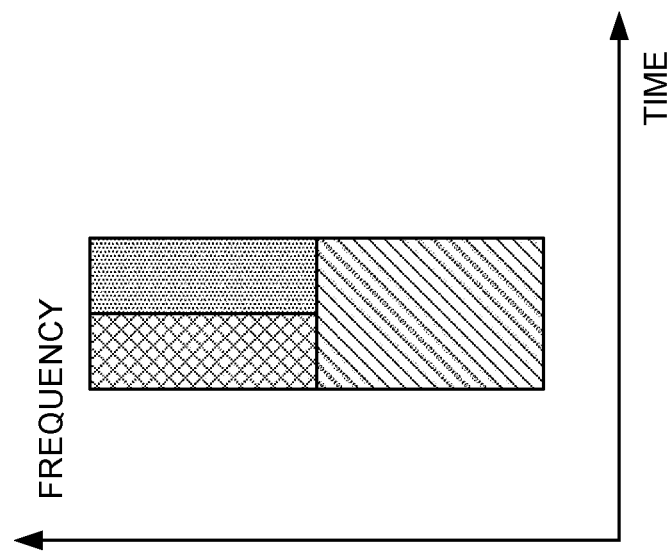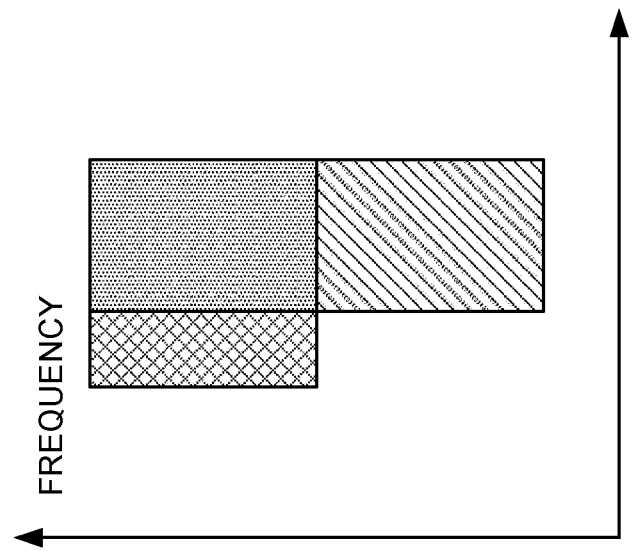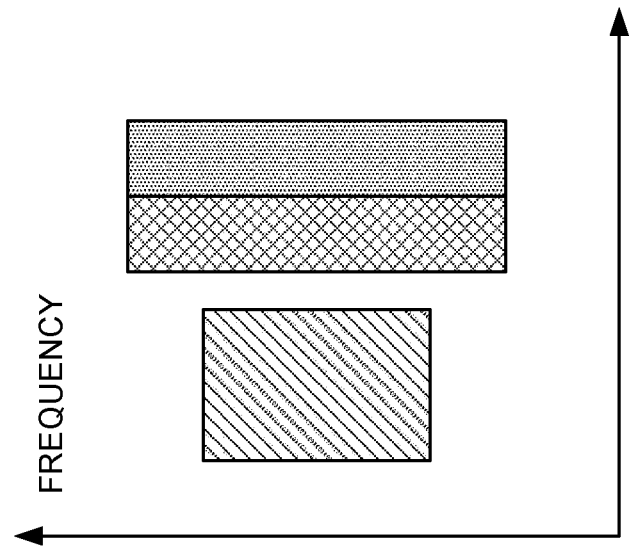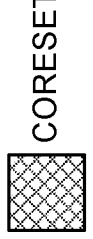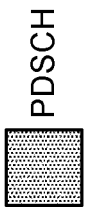

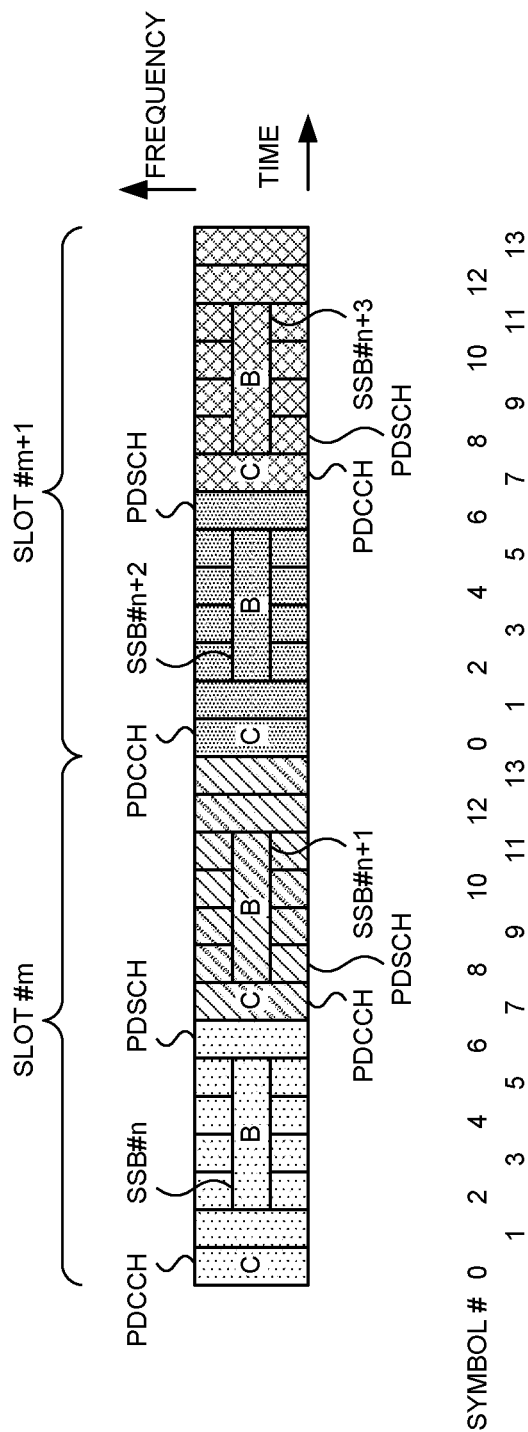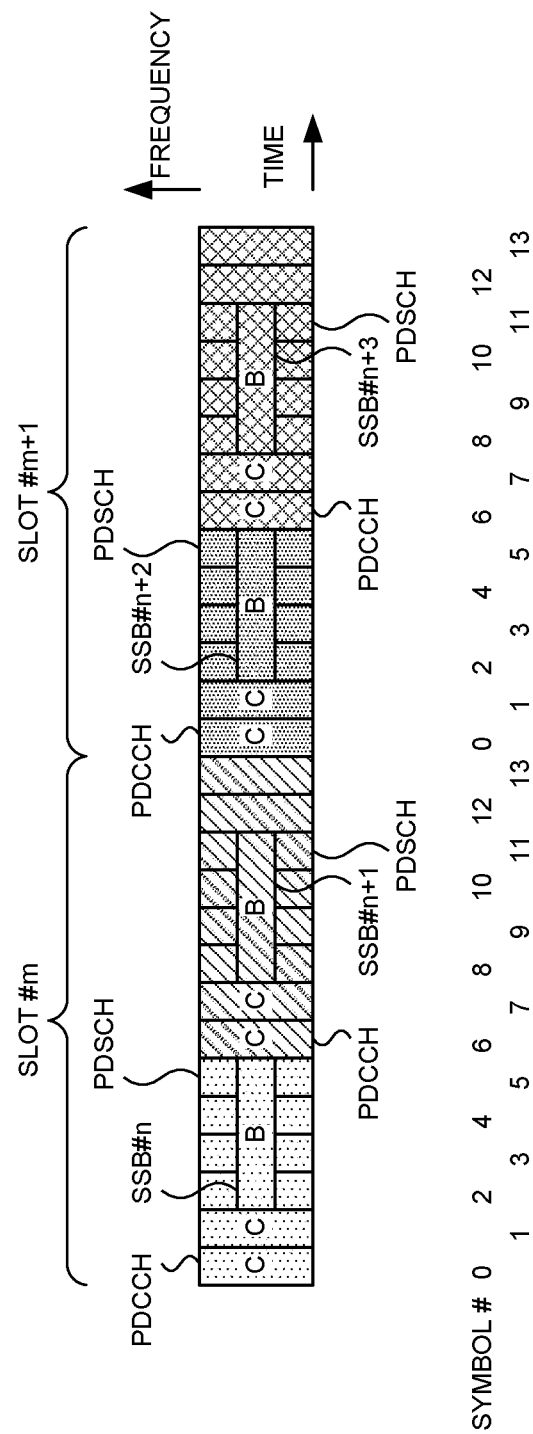

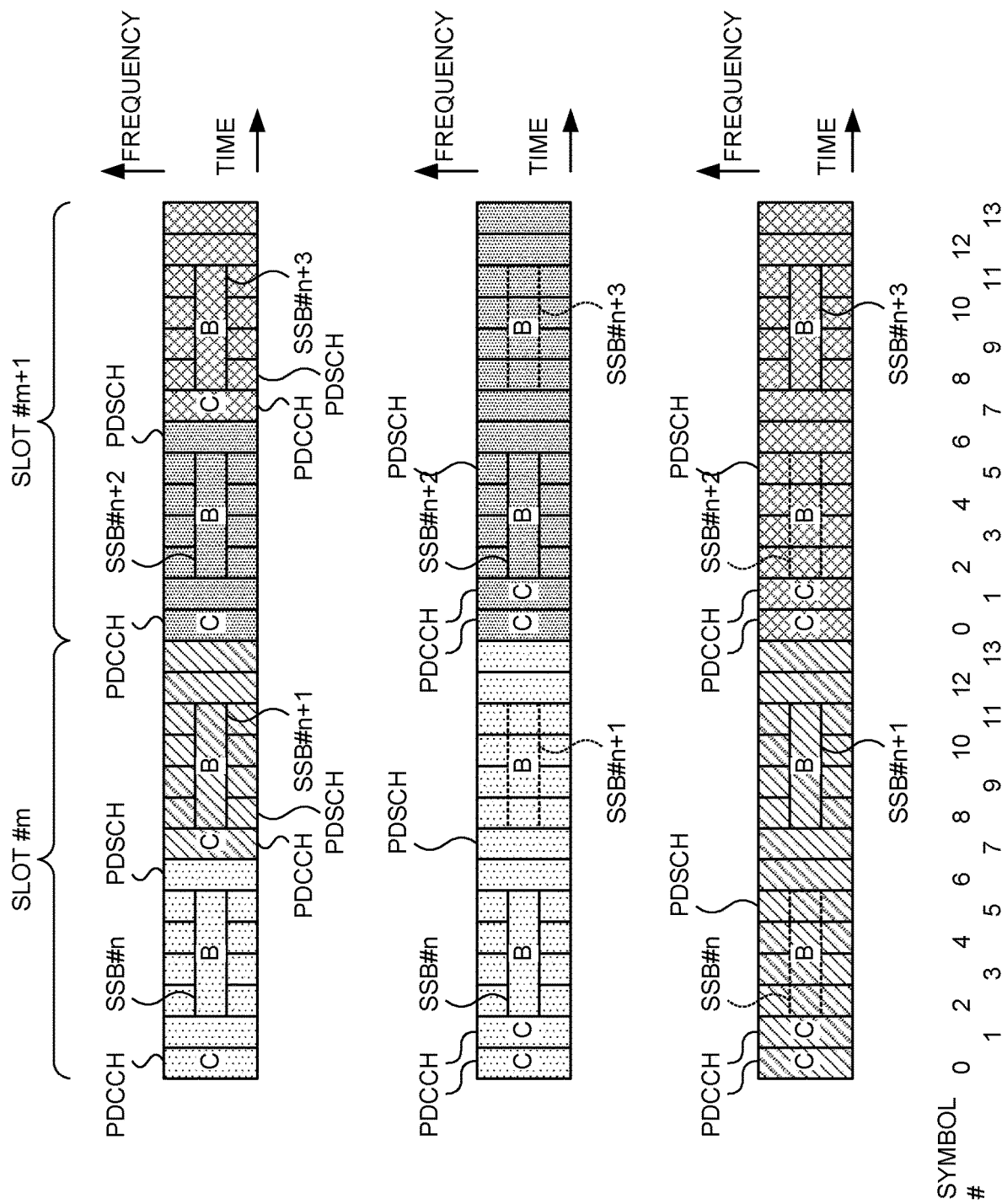

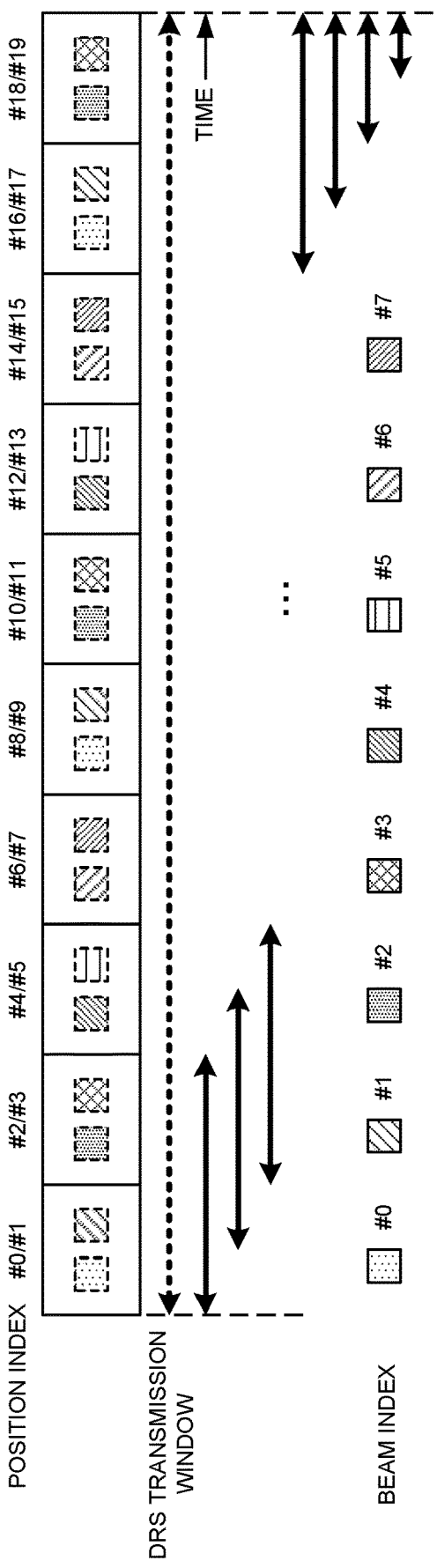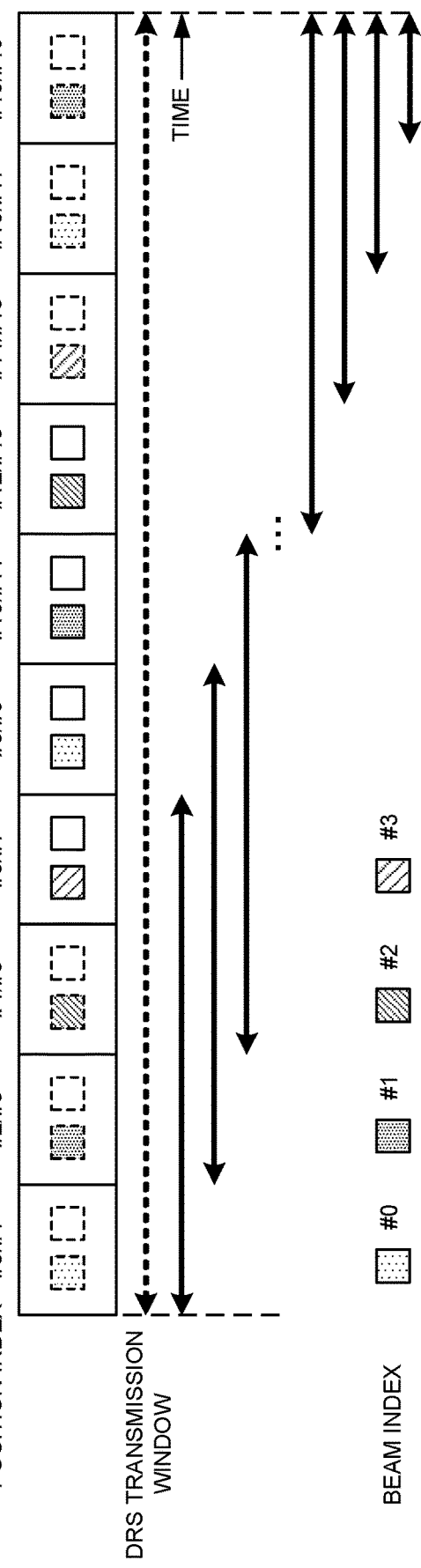

USER TERMINAL AND RADIO COMMUNICATION METHOD

TECHNICAL FIELD

The present disclosure relates to a user terminal and a radio communication method in a next-generation mobile communication system.

BACKGROUND ART

In a Universal Mobile Telecommunications System (UMTS) network, specifications of long term evolution (LTE) have been drafted for the purpose of further increasing a data rate, providing low latency, and the like (see Non Patent Literature 1). Further, the specifications of LTE-Advanced (Third Generation Partnership Project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G plus (+), New Radio (NR), or 3GPP Rel. 15 or later) are also being studied.

In existing LTE systems (for example, Rel. 8 to 12), the specifications have been drafted assuming that exclusive operation is performed in a frequency band licensed to a telecommunications carrier (operator) (also referred to as a "licensed band", a "licensed carrier", a "licensed component carrier (CC)", and so on). As the licensed CC, for example, 800 MHz, 1.7 GHz, 2 GHz, and the like are used.

Further, in the existing LTE system (for example, Rel. 13), in order to extend the frequency band, a frequency band different from the above licensed band (also referred to as an "unlicensed band", an "unlicensed carrier", or an "unlicensed CC") is supported. As the unlicensed band, for example, 2.4 GHz band or 5 GHz band in which Wi-Fi (registered trademark) or Bluetooth (registered trademark) can be used is assumed.

Specifically, in Rel. 13, carrier aggregation (CA) that integrates a carrier (CC) in the licensed band and a carrier (CC) in the unlicensed band is supported. As described above, the communication performed using the unlicensed band together with the licensed band is called License-Assisted Access (LAA).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a future radio communication system (for example, 5G, 5G+, NR, or Rel. 15 or later), a transmitting apparatus (for example, a base station in a downlink (DL) or a user terminal in an uplink (UL)) performs listening for confirming whether another apparatus (for example, a base station, a user terminal, a Wi-Fi device, or the like) transmits data in an unlicensed band before transmission of the data.

In order for such a radio communication system to coexist with other systems in the unlicensed band, it is conceivable that the radio communication system complies with a regulation or a requirement in the unlicensed band.

However, when an operation in the unlicensed band is not clearly determined, there is a risk that appropriate communication cannot be performed in the unlicensed band, for example, an operation in a specific communication situation does not conform to the regulation or utilization efficiency of radio resources is reduced.

Therefore, one of objects of the present disclosure is to provide a user terminal and a radio communication method for performing appropriate communication in an unlicensed band.

Solution to Problem

A user terminal according to one aspect of the present disclosure includes a reception section that receives a synchronization signal block including a synchronization signal and a broadcast channel at a frequency to which channel sensing before transmission is applied, and a control section that determines at least one of a configuration of a first signal including the synchronization signal block and a downlink control channel and a downlink shared channel which are quasi co-located (QCL) with the synchronization signal block and a configuration of a second signal including the first signal in a specific period based on the synchronization signal block.

Advantageous Effects of Invention

According to one aspect of the present disclosure, appropriate communication can be performed in an unlicensed band.

BRIEF DESCRIPTION OF DRAWINGS

FIGS. 1A to 1C are diagrams illustrating examples of a multiplexing pattern.

FIGS. 3A and 3B are diagrams illustrating examples of DRS mapping.

FIGS. 8A to 8C are diagrams illustrating an example of DRS mapping according to Embodiment 1.

FIGS. 9A and 9B are diagrams illustrating an example of a DRS burst configuration according to Embodiment 2.

DESCRIPTION OF EMBODIMENTS

<Unlicensed Band>

Figure 2A:
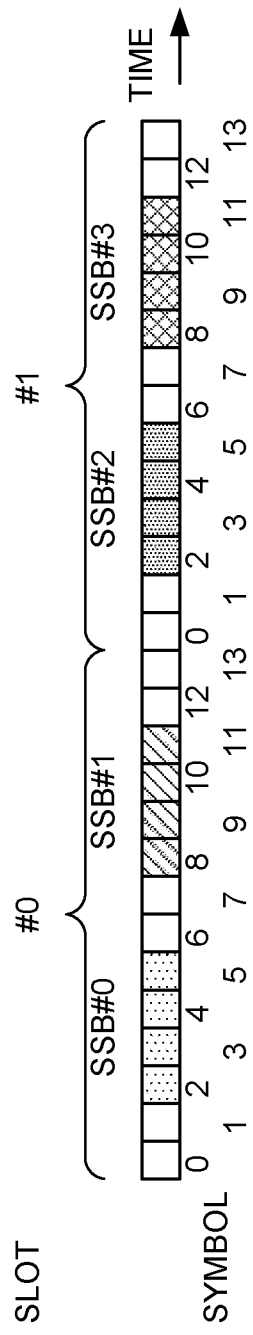
FIGS. 2A and 2B are diagrams illustrating examples of an SSB mapping pattern.

In the unlicensed band (for example, 2.4 GHz band or 5 GHz band), it is assumed that a plurality of systems such as a Wi-Fi system and a system supporting LAA (LAA system) coexist. Therefore, it is necessary to avoid collision of transmissions and/or control interference between the plurality of systems.

For example, a Wi-Fi system using an unlicensed band employs carrier sense multiple access (CSMA)/collision avoidance (CA) for the purpose of collision avoidance and/or interference control. In the CSMA/CA, Distributed access Inter Frame Space (DIFS) of a given time is provided before transmission, and a transmitting apparatus transmits data after confirming that there is no other transmission signal (carrier sense). Further, after transmitting the data, the transmitting apparatus waits for ACKnowledgement (ACK) from the receiving apparatus. When the transmitting apparatus cannot receive the ACK within the given time, the transmitting apparatus determines that a collision has occurred and performs retransmission.

In LAA of the existing LTE system (for example, Rel. 13), the transmitting apparatus of data performs listening (Listen Before Talk (LBT), Clear Channel Assessment (CCA), carrier sense, channel sensing, sensing, or channel access operation (channel access procedure) for confirming the presence or absence of transmission of other apparatuses (for example, a base station, a user terminal, a Wi-Fi device, and the like) before the transmission of the data in the unlicensed band.

The transmitting apparatus may be, for example, a base station (for example, gNodeB (gNB)) in a downlink (DL) and a user terminal (for example, user equipment (UE)) in an uplink (UL). Further, the receiving apparatus that receives the data from the transmitting apparatus may be, for example, a user terminal in the DL and a base station in the UL.

In the LAA of the existing LTE system, the transmitting apparatus starts the data transmission after a given period (for example, immediately or a backoff period) after it is detected that there is no transmission of other apparatuses in the LBT (idle state).

The following four categories are defined as channel access methods in the LTE LAA.

Category 1: A node performs transmission without performing the LBT.
Category 2: A node performs carrier sense in a fixed sensing time before transmission and performs transmission when a channel is idle.
Category 3: A node randomly generates a value (random backoff) within a given range before transmission, repeats carrier sense at a fixed sensing slot time, and performs transmission when it can be confirmed that a channel is idle over a slot of the value.
Category 4: A node randomly generates a value (random backoff) within a given range before transmission, repeats carrier sense at a fixed sensing slot time, and performs transmission when it can be confirmed that a channel is idle over a slot of the value. The node changes a range of a random backoff value (contention window size) according to a communication failure situation due to a collision with communication of another system.

As an LBT regulation, it is being studied to perform LBT according to a length of a gap between two transmissions (a non-transmission period, a period in which received power is a given threshold value or less, or the like).

The use of the unlicensed band is also studied in a future radio communication system (also referred to as, for example, 5G, 5G+, NR, 3GPP Rel. 15 or later, and the like). An NR system using an unlicensed band may be referred to as an NR-Unlicensed (U) system, an NR LAA system, or the like.

In the future, there is a possibility that the use of the future radio communication system will be considered also in dual connectivity (DC) between the licensed band and the unlicensed band or stand-alone (SA) of the unlicensed band.

In the NR-U system, a base station (gNB) or a UE obtains a transmission opportunity (TxOP) and performs transmission when an LBT result is idle. The base station or the UE does not perform transmission when the LBT result is busy (LBT-busy). A time of the transmission opportunity is referred to as a channel occupancy time (COT).

It is being studied that NR-U uses a signal including at least Synchronization Signal (SS)/Physical Broadcast CHannel (PBCH) block (SS block (SSB)). The following are being studied in an unlicensed band operation using this signal.

There is no gap within a time range in which the signal is transmitted within at least one beam
An occupied bandwidth is satisfied
A channel occupancy time of the signal is minimized
Characteristics that facilitate a quick channel access In addition, a signal including channel state information (CSI)-reference signal (RS), an SSB burst set (set of SSB), and COntrol REsource SET (CORESET) and PDSCH associated with SSB in one continuous burst signal is being studied. This signal may be referred to as a discovery reference signal (DRS, NR-U DRS, or the like).

The CORESET associated with the SSB may be referred to as a remaining minimum system information (RMSI) CORESET, CORESET-zero (CORESET0), or the like. RMSI may be referred to as a system information block 1 (SIB1). The PDSCH associated with the SSB may be a PDSCH carrying RMSI (RMSI PDSCH), or may be a PDSCH scheduled by using a PDCCH (DCI with CRC scrambled by system information (SI)-radio network temporary identifier (RNTI)) in the RMSI-CORESET.

SSBs with different SSB indexes may be transmitted by using different beams (base station Tx beams). The SSB and RMSI PDCCH and RMSI PDSCH corresponding to the SSB may be transmitted by using the same beam.

A node (for example, a base station or a UE) in NR-U confirms that a channel is idle by LBT for coexistence with other systems or other operators, and then starts transmission.

After success of the LBT, the node may continue the transmission for a certain period after starting the transmission. However, when the transmission is interrupted for a given gap period or more in the middle, there is a possibility that another system is using the channel, and thus, the LBT is thus required again before the next transmission. A period in which the transmission can be continued depends on an LBT category used or a priority class in the LBT. The priority class may be a contention window size for random backoff, or the like. The shorter the LBT period (the higher the priority class), the shorter a time in which the transmission can be continued.

The node needs to perform the transmission in a wide band according to a transmission bandwidth regulation in the unlicensed band. For example, a transmission bandwidth regulation in Europe is 80% or more of a system bandwidth.

Narrowband transmissions can collide with each other without being detected by other systems or other operators performing the LBT in a wide band.

It is preferable that the node performs the transmission in as short a time as possible. By shortening a channel occupancy time of each of a plurality of systems that coexist, the plurality of systems can efficiently share resources with each other.

It is preferable that the base station in NR-U transmits SSBs of different beams (QCL parameters, beam indexes, and SSB indexes) and RMSI PDCCH (PDCCH for scheduling RMSI PDSCH) and RMSI PDSCH associated with the SSBs by using as wide a band as possible within as short a time as possible. As a result, the base station can apply a high priority class (an LBT category of a short LBT period) to SSB/RMSI (DRS) transmission, and can be expected that the LBT will succeed with high probability. The base station easily satisfies the transmission bandwidth regulation by performing the transmission in a wide band. In addition, the base station can avoid interruption of the transmission by performing the transmission in a short time.

It is being studied that a bandwidth (UE channel bandwidth) of an initial downlink (DL) bandwidth part (BWP) for the NR-U is set to 20 MHz. This is because a channel bandwidth of Wi-Fi, which is a coexistence system, is 20 MHz. In this case, SSB, RMSI PDCCH, and RMSI PDSCH need to be included in a 20 MHz bandwidth.

In the NR-U DRS, there is no gap in a transmission period of at least one beam, and thus, it is possible to prevent another system from interrupting during the transmission period.

The NR-U DRS may be periodically transmitted regardless of whether there is UE in an active state or UE in an idle state. As a result, the base station can periodically transmit a signal required for a channel access procedure by using a simple LBT, and the UE can quickly access a cell of the NR-U.

The NR-U DRS limits the number of channel accesses required, and jams a signal in a short time, to implement a short channel occupancy time. The NR-U DRS may support NR-U of stand-alone (SA).

<Multiplexing Pattern>

In Rel.15 NR, multiplexing patterns 1 to 3 for SSB and RMSI are defined.

Multiplexing pattern 1: SSB and RMSI PDCCH CORESET (CORESET including RMSI PDCCH, CORESET #0) are time-division-multiplexed (TDM) (FIG. 1A). In other words, the SSB and the CORESET are transmitted in different times, and a band of the CORESET includes a band of the SSB. The RMSI PDSCH and the RMSI PDCCH CORESET may be time-division-multiplexed (TDM).

In a band with a narrow channel bandwidth, when SSB and CORESET cannot be frequency-division-multiplexed (FDM), it is effective that the SSB and the CORESET are time-division-multiplexed (TDM). When a plurality of beams can be transmitted at the same frequency and in the same time by digital beam forming in a low frequency band (for example, frequency range (FR) 1, 6 GHz or less), it is not necessary to perform FDM with the same beam.

Multiplexing pattern 2: SSB and RMSI PDCCH CORESET are time-division-multiplexed (TDM) and frequency-division-multiplexed (FDM) (FIG. 1B).

When SSB SCS (SubCarrier Spacing (SCS) of SSB) and RMSI SCS (SCS of RMSI) are different from each other, particularly when the SSB SCS is wider than the RMSI SCS, a time length (symbol length) of SSB becomes short, and thus, it may not become possible to frequency-division-multiplex (FDM) both of RMSI PDCCH and RMSI PDSCH with the SSB. In this case, the SSB and the RMSI PDCCH CORESET can be multiplexed on different time resources and different frequency resources.

The base station can transmit only one beam when there is a restriction to use analog beam forming. The base station can transmit one beam in a short time and suppress an overhead of beam sweeping by frequency-division-multiplexing (FDM) the RMSI PDSCH with the SSB.

Multiplexing pattern 3: SSB and RMSI PDCCH CORESET are frequency-division-multiplexed (FDM) (FIG. 1C).

The base station can transmit one beam in a short time by frequency-division-multiplexing (FDM) both of RMSI PDCCH and RMSI PDSCH with the SSB. The base station can suppress an overhead of beam sweeping by switching the beam for each SSB.

<Channel Access Procedure>

Category 2 LBT and category 4 LBT are being studied as channel access procedures for starting COT by a base station (gNB) as a Load Based Equipment (LBE) device. For a single DRS or a DRS multiplexed with non-unicast data (for example, OSI, paging, or RAR), when a duty cycle of the DRS is 1/20 or less and a total time length of the DRS is 1 ms or less (when a transmission periodicity of the DRS is 20 ms or more and a total time length of the DRS is 1 ms or less), a 25 µs category 2 LBT is used similarly to the LAA of the LTE. When the duty cycle of the DRS is more than 1/20, or when the total time length of the DRS is more than 1 ms, a category 4 LBT is used.

The category 2 LBT can be applied by transmitting, as the NR-U DRS, the SS/PBCH block, the RMSI PDCCH corresponding to the SS/PBCH block, and the RMSI PDSCH corresponding to the SS/PBCH block within a short time length (within 1 ms). The category 2 LBT which is a CCA of 25 µs without random backoff can increase a channel access success rate of the NR-U DRS as compared with the category 4 LBT with random backoff.

<SSB Transmission Candidate Position>

In the NR, the synchronization signal/physical broadcast channel (SS/PBCH) block is used. The SS/PBCH block is a signal block including a primary synchronization signal (PSS), a secondary synchronization signal (SSS), and a physical broadcast channel (PBCH) (and DeModulation Reference Signal (DMRS) for PBCH). The SS/PBCH block may be referred to as a synchronization signal block (SSB).

A Type 0-PDCCH monitoring configuration (RMSI PDCCH monitoring occasion (time position)) for the NR-U may satisfy at least the following characteristics.

The Type 0-PDCCH and the SSB are time-division-multiplexed (TDM) as in the existing multiplexing pattern 1

Monitoring of a Type 0-PDCCH of a second SSB in the slot is supported in a gap between a first SSB and a second SSB in the slot (this monitoring may be started from a symbol #6 or may be started from a symbol #7)

Type 0-PDCCH candidates associated with one SSB are limited within a slot carrying the associated SSB.

The following SSB mapping patterns 1 and 2 are being studied as transmission candidate positions of the SSBs (candidate SS/PBCH blocks (candidate SSBs)) in the slot.

SSB Mapping Pattern 1: Case a and Case C in Rel. 15

Two SSBs per slot are mapped to symbols #2, #3, #4, and #5 and symbols #8, #9, #10, and #11, respectively (FIG. 2A).

SSB Mapping Pattern 2: New Case

Figure 2B:
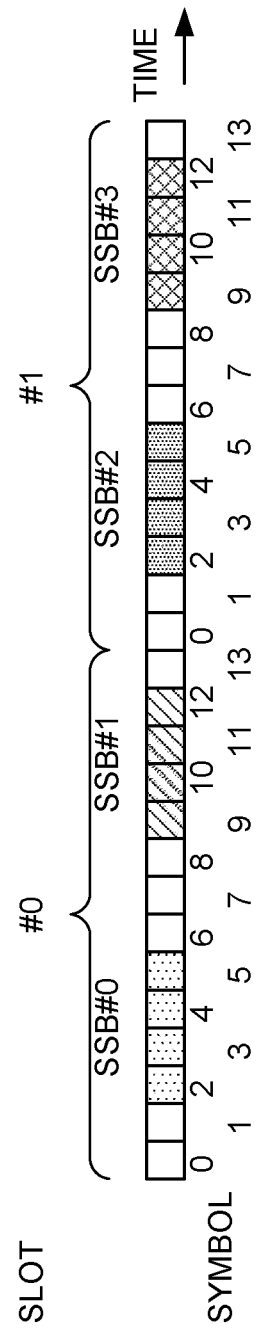

Two SSBs per slot pattern are mapped to the symbols #2, #3, #4, and #5 and the symbols #9, #10, #11, and #12, respectively (FIG. 2B).

The SSB mapping pattern may be associated with at least one of the SCS and the band (operating band or frequency band). The UE may determine the SSB mapping pattern based on at least one of the SCS and the band.

Due to the use of the SSB mapping pattern 1 for the unlicensed band, the SSB mapping pattern can be common between the licensed band and the unlicensed band, and the processing can be common. Accordingly, a processing load of the UE can be suppressed.

In the SSB mapping pattern 2, the SSB transmission candidate positions can be common between the first seven symbols and the second seven symbols of one slot, and the processing can be common. Accordingly, the processing load of the UE can be suppressed.

When the SSB is detected, since the UE obtains a head of a frame based on a timing of the SSB, it is necessary to switch the SSB mapping pattern between an NR target frequency and an NR-U target frequency. In addition, a scheduler performs rate matching on resources of the SSB when the SSB and data are multiplexed. It is necessary to switch the resources of the rate matching between the NR-U target frequency and the NR-U target frequency. As described above, when the SSB mapping pattern is different between the NR target frequency and the NR-U target frequency, the processing may be complicated.

As illustrated in FIG. 3A, when the SSB mapping pattern 1 is used and the number of symbols of CORESET0 is one, the RMSI PDCCH (C in the drawing) corresponding to the first SSB (#n, #n+2, B in the drawing) can be mapped to symbol #0, and the corresponding RMSI PDSCH can be mapped to the symbols #2 to #6. The RMSI PDCCH (C in the drawing) corresponding to the second SSB (#n+1, #n+3, B in the drawing) can be mapped to the symbol #7, and the corresponding RMSI PDSCH can be mapped to the symbols #8 to #13. That is, the number of symbols of the RMSI PDSCH corresponding to the first SSB is six, and the number of symbols of the RMSI PDSCH corresponding to the second SSB is six.

As illustrated in FIG. 3B, when the SSB mapping pattern 1 is used and the number of symbols of CORESET0 is two, an RMSI PDCCH (C in the drawing) corresponding to the first SSB (#n, #n+2, B in the drawing) can be mapped to the symbols #0 and #1, and the corresponding RMSI PDSCH can be mapped to the symbols #2 to #5. The RMSI PDCCH (C in the drawing) corresponding to the second SSB (#n+1, #n+3, B in the drawing) can be mapped to the symbols #6 and #7, and the corresponding RMSI PDSCH can be mapped to the symbols #8 to #13. That is, the number of symbols of the RMSI PDSCH corresponding to the first SSB is four, the number of symbols of the RMSI PDSCH corresponding to the second SSB is six, and the number of symbols of the RMSI PDSCH corresponding to the first SSB is smaller than the number of symbols of the RMSI PDSCH corresponding to the second SSB. That is, the capacity of the RMSI PDSCH corresponding to the first SSB decreases.

In this case, the number of symbols of the RMSI PDSCH corresponding to the first SSB is four, the number of symbols of the RMSI PDSCH corresponding to the second SSB is six, and the number of symbols of the RMSI PDSCH corresponding to the first SSB is smaller than the number of symbols of the RMSI PDSCH corresponding to the second SSB. That is, the capacity of the RMSI PDSCH corresponding to the first SSB decreases. In particular, when the number of symbols of CORESET0 is two, the number of resources available for the RMSI PDSCH is reduced.

In addition, since it is required to shorten the time length of the DRS at the NR-U target frequency, it is preferable that the SSB, the corresponding RMSI PDCCH, and the corresponding RMSI PDSCH are mapped in the same slot as illustrated in FIGS. 3A and 3B.

When the monitoring of the Type 0-PDCCH of the second SSB in the slot between the first SSB and the second SSB in the slot is supported, the resources available for the RMSI PDSCH are reduced. When the capacity of the RMSI PDSCH is insufficient, a coding rate increases, and a problem such as performance degradation occurs.

In order to increase the number of resources available for the RMSI PDSCH, it is conceivable that the number of SSBs in the slot is variable (control can be performed by changing the number of SSBs). For example, it is assumed that the number of SSBs in the slot is one (see FIGS. 4A and 4B).

Figure 4A:
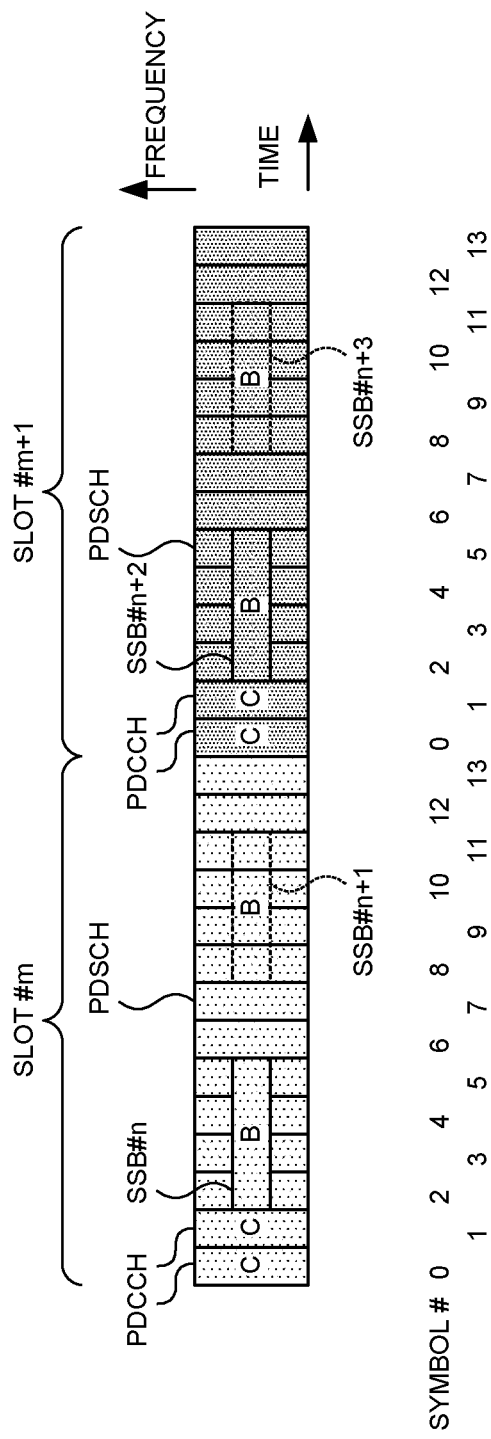
FIGS. 4A and 4B are diagrams illustrating examples of a case where one SSB is mapped in one slot.
Figure 4B:
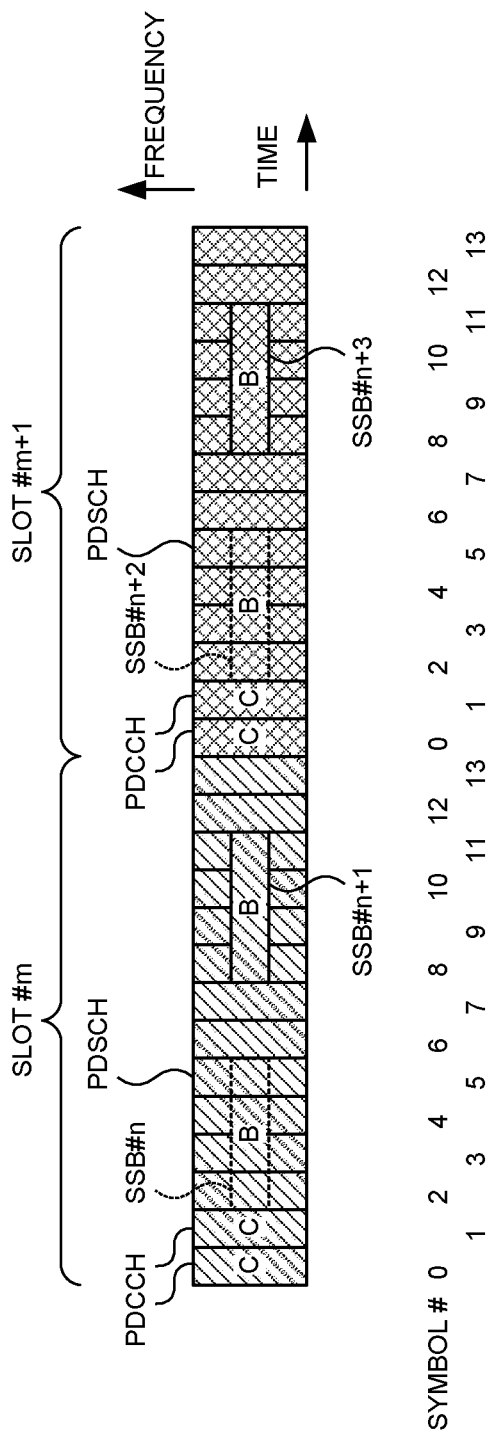

FIG. 4A illustrates a case where the SSB is transmitted by using the candidate position (SSB #n, SSB #n+2) configured in the first half of the slot and the SSB is not transmitted by using the candidate position (SSB #n+1, SSB #n+3) configured in the second half. In this case, in a slot #m, the resources of the RMSI PDSCH corresponding to the SSB #n can be configured for a domain (for example, at least one domain of time and frequency) including the other SSB candidate position (SSB #n+1) by using the PDCCH (or DCI) corresponding to the SSB transmitted in the SSB FIG. 4B illustrates a case where the SSB is transmitted by using the candidate position (SSB #n+1, SSB #n+3) configured in the second half of the slot and the SSB is not transmitted by using the candidate position (SSB SSB #n+2) configured in the first half. In this case, it is assumed that the resources of the RMSI PDSCH corresponding to the SSB #n+1 are configured for a region including the other SSB candidate position (SSB #n) by using the PDCCH (or DCI) corresponding to the SSB #n+1 in the slot #m.

In such a case, when the PDCCH corresponding to the SSB #n+1 is allocated to the symbol #6 or #7, it is difficult to map the PDSCH resource to the symbol before the PDCCH. Thus, as illustrated in FIG. 4B, it is conceivable that the PDCCH (or PDCCH monitoring occasion) corresponding to the SSB #n+1 is allocated to the first half (for example, symbol #0 or #1) of the slot.

Higher layer parameters (for example, which may be referred to as a Radio Resource Control (RRC) parameter "ssb-PositionsInBurst") related to several transmission units of aggregated SSBs may be configured for the UE. The transmission unit of the SSB may be referred to as a transmission period of the SSB, an SSB set, an SS burst, an SS burst set, an SSB burst, simply a burst, or the like. The SS burst may mean a set of SSBs included per given period (for example, a half frame (0.5 radio frame)). The higher layer parameter may be referred to as information (parameter) related to a position of a time domain of the transmitted SSB in the SS burst. In the present disclosure, the higher layer parameter is described as the ssb-PositionsInBurst, but the name is not limited thereto.

A size (bit length) of the ssb-PositionsInBurst may be different according to a frequency used by a serving cell. The ssb-PositionsInBurst may be defined as, for example, 4 bits for a frequency of 3 GHz or 2.4 GHz or less, 8 bits for a frequency of 3 GHz or 2.4 GHz to 6 GHz, or 64 bits for other frequencies. In other words, the size of the ssb-PositionsInBurst may be 4 or 8 bits when the subcarrier spacing (SCS) of the SSB is 15 kHz or 30 kHz, or may be larger than 8 bits when the subcarrier spacing of the SSB is 120 kHz or 240 kHz. Of course, the frequency, the SCS, the size of the ssb-PositionsInBurst, and the like are not limited thereto.

The ssb-PositionsInBurst is a bitmap, and the bits thereof indicate the SSB transmission candidate positions in the SS burst such that the leftmost (first) bit corresponds to the SSB index #0, the second bit corresponds to the SSB index #1, and . . . . A value '1' of the bit indicates that the corresponding SSB is transmitted, and '0' indicates that the corresponding SSB is not transmitted.

When the maximum number of SSBs in the half frame is 64, the ssb-PositionsInBurst in the SIB1 includes a bitmap indicating whether there is each of groups having eight or less SSBs and a bitmap indicating whether there is each of the eight or less SSBs in the group. Similarly to the ssb-PositionsInBurst notification of which is given by RRC signaling, when the maximum number of SSBs in the half frame is eight or less, the ssb-PositionsInBurst in the SIB1 includes a bitmap indicating whether there is each of the eight or less SSBs.

When the NR-U target frequency is the 5 GHz band or the 6 GHz band, an 8-bit bitmap indicates whether the SSB is transmitted at each of eight SSB transmission candidate positions according to Rel. 15 NR.

Note that, in the present disclosure, the SSB transmission candidate position may represent a position of a first symbol of the SSB candidate. The SSB index may indicate a position of the SSB per given time period (for example, half frame (0.5 radio frame)).

The SSB index may be represented by the maximum number of three bits in the frequency range 1 (FR1), or may be obtained by the UE by a sequence of DMRSs in the PBCH. In the frequency range 2 (FR2), the SSB index may be represented by a total of six bits of lower three bits by the sequence of DMRSs in the PBCH and higher three bits by a payload of the PBCH, or may be obtained by the UE based on the six bits.

The UE may assume that SSBs corresponding to the same SSB index in the same cell are quasi co-located (QCL). In addition, the UE may not assume that SSBs corresponding to different SSB indexes of the same cell are quasi co-located (QCL).

The UE may assume the same Quasi-Co-Location (QCL) for PDCCH monitoring opportunities associated with the same SSB. For example, the UE may assume the same QCL as the first SSB to be transmitted for the first and (N+1)-th PDCCH monitoring opportunities in FIG. 6, and may receive the PDCCH.

Note that the QCL is an indicator of statistical characteristics of at least one of a signal and a channel (represented as channel/signal). For example, a case where one signal/channel and another signal/channel have a QCL relation may mean that it is possible to assume that the plurality of different signals/channels have at least one identical property out of Doppler shift, Doppler spread, average delay, delay spread, and spatial parameter (for example, spatial Rx parameter) (a QCL relation is established regarding at least one of these properties).

The UE assumes that a given control resource set (CORESET), a channel, or a reference signal has a specific QCL (for example, QCL type D) relation with another CORESET, channel, or reference signal may be referred to as a QCL assumption.

<DRS Transmission Window>
For the NR-U, it is being studied that the transmission candidate position of the SSB is extended in consideration of a case where the SSB cannot be transmitted due to a failure of the LBT. For example, in a period in which there is a possibility that the DRS will be transmitted (DRS transmission window), it is being studied that the SSB transmission candidate position is extended and the SSB (beam) that could not be transmitted due to the failure of the LBT are transmitted by using another transmission candidate position in the window.

Note that a length of the DRS transmission window may be configured for the UE by higher layer signaling, or may be defined by a specification. The DRS transmission window may be referred to as a DRS transmission period, a DRS transmission window period, or the like.

Figure 5A:
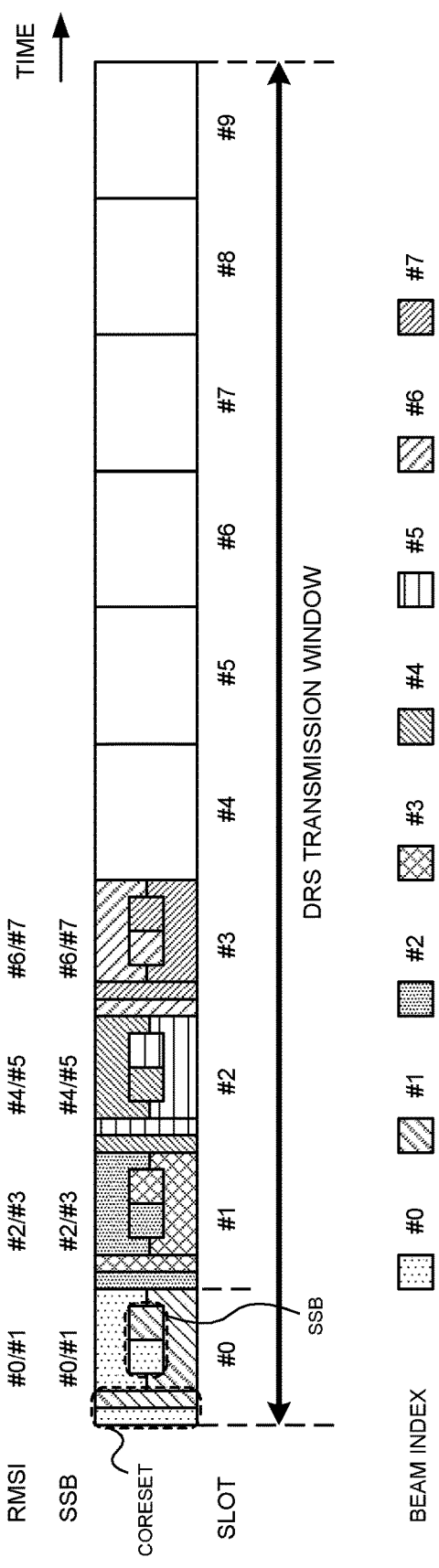
FIG. 5A and FIG. 5B are diagrams illustrating examples of extension of an SSB transmission candidate position.
Figure 5B:
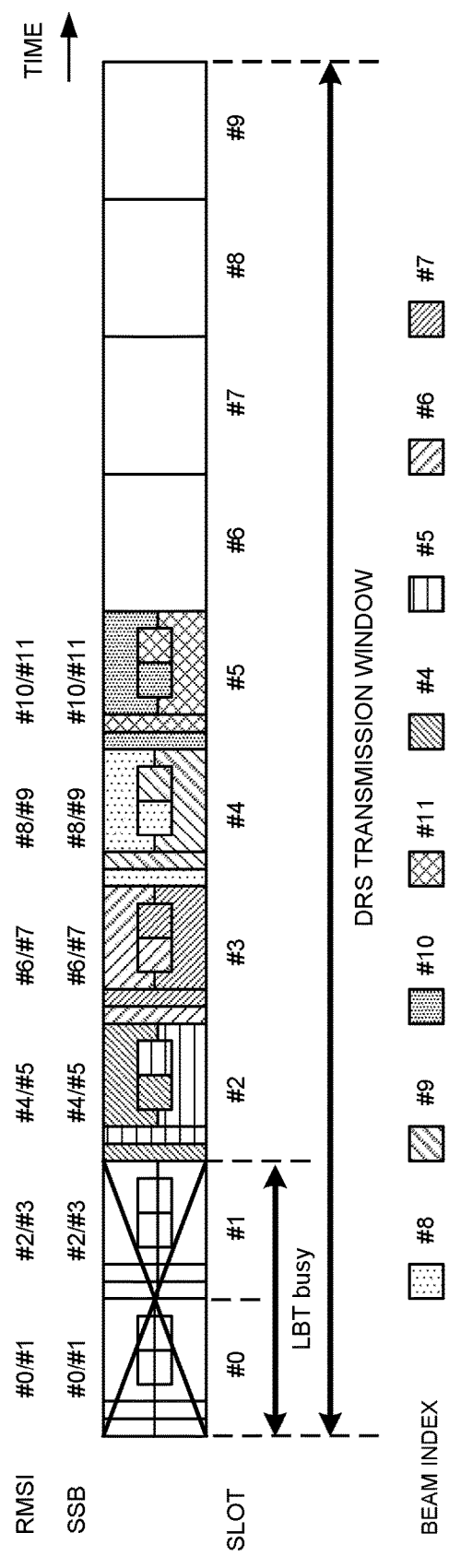

FIGS. 5A and 5B are diagrams illustrating an example of the extension of the SSB transmission candidate position. In this example, it is assumed that the SCS of the serving cell (or the SSB) is 30 kHz and a slot length is 0.5 ms. In addition, it is also assumed that the length of the DRS transmission window is 5 ms. Similar SCS and DRS transmission window lengths are assumed in the following drawings. Note that the application of the present disclosure is not limited to these SCS and DRS transmission window lengths.

In FIG. 5A, the DRS is transmitted over four slots (slots #0 to #3). Here, in the slot #0 in FIG. 5A, an SSB, a CORESET (PDCCH) associated with the SSB, and a PDSCH associated with the SSB (a portion other than the SSB and the CORESET) are illustrated. The arrangement of the other slots may be similar. In FIG. 5A, SSB #i (i=0 to 7) and RMSI #i (PDCCH/PDSCH) may be transmitted by using the same beam.

FIG. 5B illustrates a case where the slots #0 and #1 in FIG. 5A cannot be transmitted due to LBT busy (LBT failure). In this case, the UE may assume that beams of the SSBs #0 to #3 that are not transmitted are respectively transmitted by using the SSBs #8 to #11 in the slots after the SSBs #4 to #7.

That is, in this example, the PDCCH monitoring opportunities for RMSI are associated with the SSB indexes (position indexes) corresponding to the SSB candidate positions within the DRS window.

Figure 6:
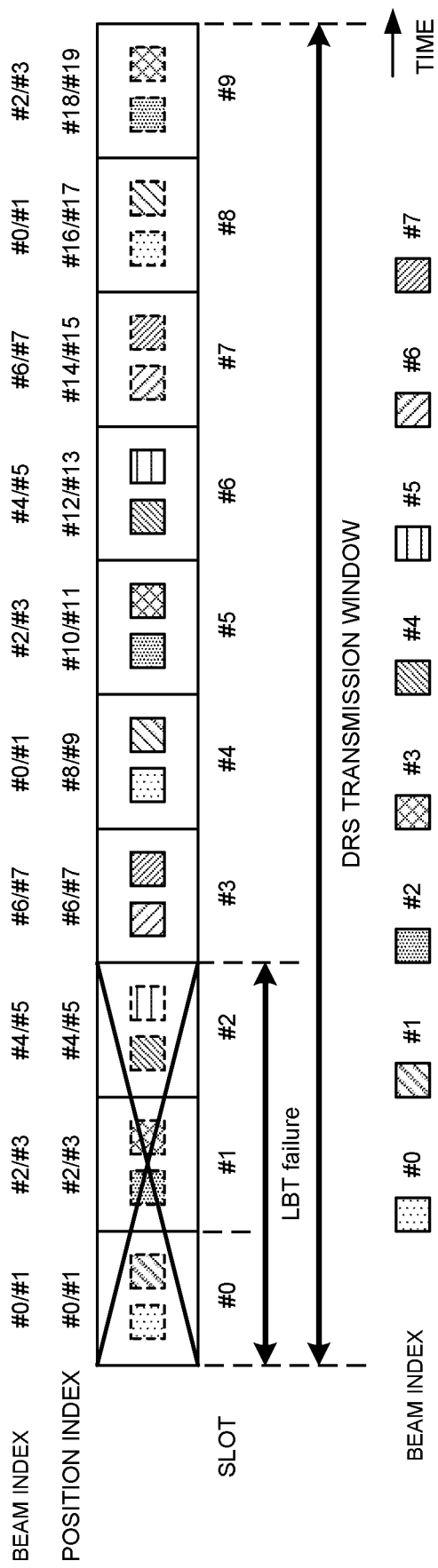
FIG. 6 is a diagram illustrating another example of the extension of the SSB transmission candidate position.

FIG. 6 is a diagram illustrating another example of the extension of the SSB transmission candidate position. In this example, a case where the number of transmission SSBs is eight and is the same as the number of beams (the number of beams is also eight (beam indexes #0 to #7)) will be described. In this case, the beam index #k corresponds to the position index #8i+k (i=0, 1, and 2).

<DRS Unit>
At the NR-U target frequency, when the SSB mapping pattern 1 is used, the position of the SSB is different between the first seven symbols and the second seven symbols in one slot. In particular, when the RMSI PDCCH corresponding to the second SSB in one slot is placed in the symbol #6, the configuration of the first DRS unit and the configuration of the second DRS unit in one slot are non-uniform.

In the present disclosure, a downlink signal including one SSB and an RMSI PDCCH and an RMSI PDSCH which are quasi co-located (QCL) with the SSB (transmitted by using the same beam as the SSB) may be referred to as a DRS. A resource (for example, consecutive symbols) to which the DRS is mapped may be referred to as a DRS unit. A time length of the DRS unit may be referred to as a DRS unit size, the number of symbols in the DRS unit, or the like. A DRS burst including a plurality of DRS units may be transmitted. The plurality of DRS units included in the DRS burst may use the same beam or different beams.

As illustrated in FIG. 3B, when the number of CORESET symbols is two, the PDCCHs corresponding to the first SSB (#n, #n+2) in the slot are mapped to the symbols #0 and #1, and the PDCCHs corresponding to the second SSB (#n+1, #n+3) in the slot are mapped to the symbols #6 and #7. The DRS unit size corresponding to the first SSB is six symbols, and the DRS unit size corresponding to the second SSB is eight symbols.

In addition, when a case where the DRS unit size is a half slot (two DRS units are transmitted in one slot and the DRS unit size is seven symbols) and a case where the time length of the DRS unit is one slot (one DRS unit is transmitted in one slot) are selectable, the UE cannot appropriately perform rate matching in the PDSCH reception in the slot in which the SSB is transmitted without knowing the DRS burst configuration.

In addition, since resources of the actually transmitted DRS units are shifted by the LBT, even though the existing ssb-PositionInBurst is used for the notification of the DRS burst configuration, the UE cannot appropriately recognize the DRS burst configuration.

Figure 7:
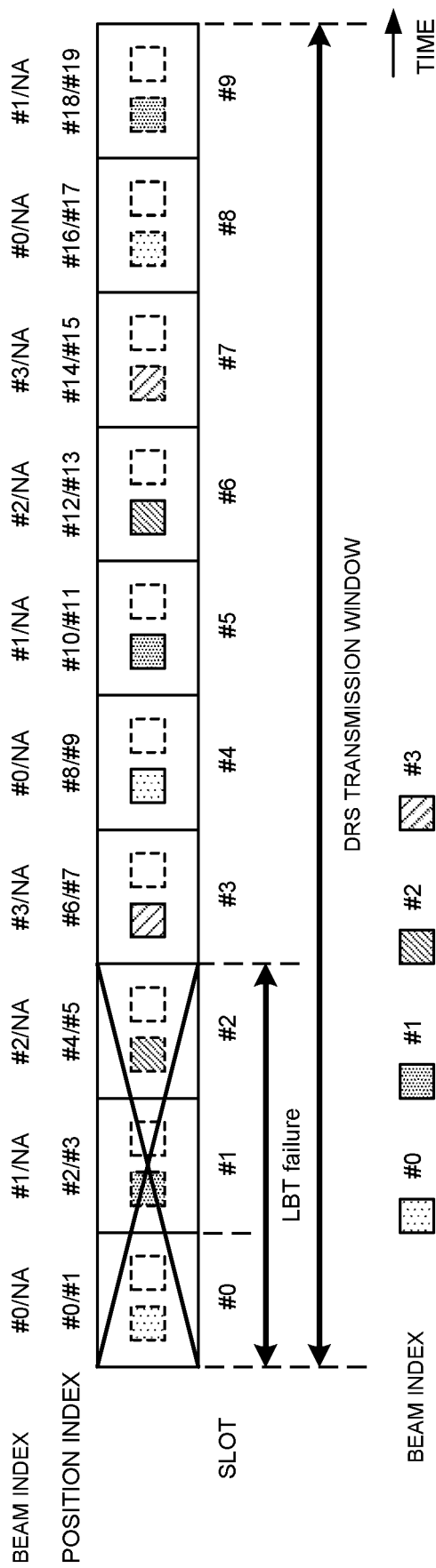
FIG. 7 is a diagram illustrating an example of extension of an SSB transmission candidate position when one SSB is mapped in one slot.

FIG. 7 is a diagram illustrating an example of the extension of the SSB transmission candidate position when the DRS unit size is one slot. This example illustrates a case where the DRS unit size is one slot, the number of transmission SSBs is four, and the number of beams is four (beam indexes #0 to #3). In this case, the beam index #k corresponds to the position index #4i+k (i=0, 1, and 2).

In such a case, notification of the DRS burst configuration cannot be appropriately given by using the existing ssb-PositionInBurst.

Thus, the present inventors have conceived a method for recognizing the configuration of the signal (DRS) including the SSB and the PDCCH and the PDSCH corresponding to the SSB at the NR-U target frequency by means of the UE. As a result, a flexible DRS transmission configuration is allowed while an increase in complexity is suppressed, and thus, a DRS coverage and data throughput can be improved.

Hereinafter, embodiments according to the present disclosure will be described in detail with reference to the drawings. Radio communication methods according to the respective embodiments may be applied independently, or may be applied in combination.

In the present disclosure, a frequency, a band, a spectrum, a carrier, a component carrier (CC), and a cell may be replaced with each other.

In the present disclosure, the NR-U target frequency, the unlicensed band, an unlicensed spectrum, LAA SCell, an LAA cell, a primary cell (PCell, primary secondary cell (PSCell), or special cell (SpCell)), a secondary cell (SCell), and a first frequency that requires channel sensing before transmission may be replaced with each other. In the present disclosure, the listening, the Listen Before Talk (LBT), the Clear Channel Assessment (CCA), the carrier sense, the sensing, the channel sensing, and the channel access operation may be replaced with each other.

In the present disclosure, the NR target frequency, the licensed band, the licensed spectrum, the PCell, the PSCell, the SpCell, the SCell, the non-NR-U target frequency, the Rel. 15, the NR, and a second frequency that does not require channel sensing before transmission may be replaced with each other.

Different frame structures may be used at the NR-U target frequency and the NR target frequency.

The radio communication system (NR-U, LAA system) may comply with (support) a first radio communication standard (for example, NR, LTE, or the like).

Other systems that coexist with this radio communication system (coexistence system, coexistence apparatus) and other radio communication apparatuses (coexistence apparatus) may comply with (support) a second radio communication standard, which is different from the first radio communication standard, such as Wi-Fi, Bluetooth (registered trademark), WiGig (registered trademark), a wireless local area network (LAN), IEEE802.11, a low-power wide-area (LPWA), and the like. The coexistence system may be a system that receives interference from the radio communication system or a system that gives interference to the radio communication system.

The SSB, the RMSI PDCCH, the RMSI PDSCH, the DRS, the DRS unit, and the NR-U DRS corresponding to one beam (QCL parameter) may be replaced with each other. In the SSB, the SS/PBCH block, the beam, the base station Tx beam, and a first signal may be replaced with each other.

The channel quasi co-located (QCL) with the SSB, the channel quasi co-located (QCL) with the SSB, the channel having the same QCL property (QCL parameter) as the SSB, and the channel transmitted by using the same beam as the SSB may be replaced with each other.

The RMSI PDCCH, the DCI having the CRC scrambled by the SI-RNTI and having a system information indicator set to zero, the PDCCH for scheduling the RMSI PDSCH, the PDCCH corresponding to the SSB, the RMSI CORESET, the Type 0-PDCCH, the CORESET0, the CORESET having the index 0, the PDCCH, and the CORESET may be replaced with each other.

The RMSI PDSCH, the PDSCH scheduled by the DCI having the CRC scrambled by the SI-RNTI and having the system information indicator set to zero, the system information, the SIB1, the PDSCH carrying the SIB1, the PDSCH corresponding to the SSB, and the PDSCH may be replaced with each other.

For at least one of the SSB, the RMSI PDCCH, and the RMSI PDSCH, the configuration at the NR target frequency may be replaced with the configuration in the Rel. 15 NR.

Note that, in the present disclosure, the SSB corresponding to the SSB index is also simply referred to as an SSB index. In addition, the beam corresponding to the beam index is also simply referred to as a beam index.

Note that the beam index may correspond to a set of SSB indexes for which the QCL relation can be assumed in the DRS transmission window. Thus, the beam index may be replaced with an effective SSB index. On the other hand, the SSB index simply indicating the SSB candidate position in the DRS transmission window may be replaced with an SSB position index, a position index, or the like.

Further, the NR-U of the present disclosure is not limited to the LAA, and may include a case where the unlicensed band is used in the stand-alone.

(Radio Communication Method)

Embodiment 1

At the NR-U target frequency, the UE may determine the DRS unit configuration (for example, the DRS unit size and the number of DRS units in the slot) based on the number of CORESET #0 symbols. When the SSB mapping pattern 1 is used at the NR-U target frequency, the UE may determine the DRS unit configuration based on the number of CORESET #0 symbols.

The UE may support at least one of a half slot and one slot as the DRS unit size.

The UE may support at least one of one and two as the number of CORESET #0 symbols. The UE may determine the number of CORESET #0 symbols from the PDCCH configuration information for the SIB1 (pdcch-ConfigSIB1) included in the MIB. When the number of CORESET #0 symbols determined is one, the UE may determine (may consider) that the DRS unit size is a half slot (the number of DRS units in the slot is two). When the number of CORESET #0 symbols determined is greater than or equal to two, the UE may determine (may consider) that the DRS unit size is one slot (the number of DRS units in the slot is one).

When the SSB mapping pattern 1 is used, the UE may not support that the number of CORESET #0 symbols is greater than or equal to two, and the DRS unit size is a half slot. When the SSB mapping pattern 1 is used and the number of CORESET #0 symbols is one, as illustrated in FIG. 8A, the DRS unit sizes of both the first half DRS unit and the second half DRS unit may be seven symbols. As a result, the DRS unit sizes of the first half and the DRS unit size of the second half can be uniform.

When the number of CORESET #0 symbols is greater than or equal to two (when the DRS unit size is one slot), the UE may be notified whether the actually transmitted SSB in one slot is the first SSB (FIG. 8B) or the second SSB (FIG. 8C).

When only the first SSB in the slot is transmitted, the UE can recognize that the PDCCH monitoring occasion corresponding to the detected SSB is a head of the slot regardless of the DRS unit size. Since this processing does not depend on the DRS unit size, the processing can be simplified.

When the DRS unit size is one slot and only the second SSB in the slot is transmitted, the number of symbols of the RMSI CORESET (PDCCH) can be three, and the capacity of the PDCCH is increased. Further, in the Rel. 15 NR, the position of the PDSCH DMRS can be set to the symbol #2 or #3. When the first SSB in the slot is transmitted, the PDSCH DMRS cannot be mapped to the band of the SSB of the symbol #2 or #3. In this case, different signals are used for channel estimation within the band of the SSB and channel estimation out of the band of the SSB, and thus, processing is complicated. When the DRS unit size is one slot and only the second SSB in the slot is transmitted, the PDSCH DMRS can be mapped to the entire band of the symbol #2 or #3, the channel estimation can be performed at a time, and processing is simplified.

When the SSB mapping pattern 2 is used, the UE may support that the number of CORESET #0 symbols is two, and the DRS unit size is a half slot. In this case, the UE may be notified whether the DRS unit size is a half slot or one slot.

When the DRS unit size is one slot, the UE may determine whether the actually transmitted SSB in the one slot is the first SSB or the second SSB. Whether the actually transmitted SSB in one slot is the first SSB or the second SSB may be fixed by a specification. The UE may be notified whether the actually transmitted SSB in one slot is the first SSB or the second SSB. The notification may use, for example, a specific bit in the MIB.

The UE may determine a starting position of the Type 0-PDCCH monitoring occasion based on the content of this notification. In a case where the second SSB in one slot is transmitted, when the DRS unit size is one slot, the PDCCH corresponding to the SSB may be mapped to the head of the slot, and when the DRS unit size is a half slot, the PDCCH corresponding to the SSB may be mapped to a slot immediately before the SSB.

The UE may receive information on the configuration of the DRS unit (for example, the DRS unit size) by RRC signaling. For example, the UE using non-stand-alone (NSA, for example, EN-DC) may receive the information on the configuration of the DRS unit by RRC signaling.

According to the above Embodiment 1, the DRS unit size can be recognized. As a result, the UE can recognize the SSB position in the DRS unit, and can appropriately perform the rate matching of the RMSI PDSCH.

When the SSB mapping type 1 is used, the number of CORESET #0 symbols is one, and the DRS unit size is a half slot, the amount of resources of each DRS unit is uniform. Thus, the base station prepares data to be transmitted, and can use the prepared information even though transmission is postponed according to the LBT result.

When the DRS unit size is one slot, the amount of resources of each DRS unit is uniform. Thus, the base station prepares data to be transmitted, and can use the prepared information even though transmission is postponed according to the LBT result. In addition, sufficient resources can be secured for the RMSI PDSCH.

Embodiment 2

The UE may be notified of information on the number of DRS units (DRS unit number) actually transmitted in the DRS burst (second signal) at the NR-U target frequency. The DRS burst may be consecutive DRS units within a specific period. The specific period may be DRS unit size×number of DRS units. The information on the number of DRS units may be included in the MIB.

The UE may determine the number of CORESET #0 symbols based on the PDCCH configuration information for the SIB1 (pdcch-ConfigSIB1) in the MIB. The UE may determine the DRS unit size based on the number of CORESET #0 symbols.

The UE may be notified of the number of DRS units by a specific bit in the MIB.

A maximum value of the number of DRS units may be fixed (for example, eight) regardless of the DRS unit size. The maximum value of the number of DRS units may be associated with the DRS unit size. For example, when the DRS unit size is a half slot, the maximum value of the number of DRS units may be eight, and when the DRS unit size is one slot, the maximum value of the number of DRS units may be four.

When the DRS unit size is one slot, the UE may be notified of the number of DRS units and information indicating which one of the first and second SSBs in one slot is transmitted. When the DRS unit size is a half slot, the UE may be notified by three bits that the number of DRS units is eight or less, and when the DRS unit size is one slot, the UE may be notified by two bits that the number of DRS units is four or less. The UE may be notified by one bit of transmission SSB information (information indicating which of the first and second SSBs in one slot is transmitted). As a result, the number of bits of the notification becomes constant regardless of the DRS unit size.

The UE may determine (recognize) the DRS burst configuration based on at least one of the DRS unit size, the number of DRS units, and the information on the actually transmitted SSB (either the first and second SSBs in one slot). The UE may recognize the DRS burst configuration without using the SSB position information (ssb-PositionInBurst) in the burst.

The UE may assume that the DRS burst is transmitted at consecutive DRS unit candidate positions for the number of DRS units. In other words, the UE may not assume that the DRS units in the DRS burst are discontinuous.

The UE may determine the SSB index of the SSB based on at least one of the bits in the MIB in the detected SSB and the sequence of DMRSs in the PBCH. The SSB index may be a position index indicating the transmission candidate position, or may be a beam index corresponding to the beam (QCL relationship) used for transmission.

FIG. 9A illustrates an example of the DRS burst configuration when the DRS unit size is a half slot and the number of DRS units is four. The DRS burst in this example is four consecutive DRS units, and a time length of the DRS burst is two slots. The DRS burst is transmitted from different timings according to the LBT result.

FIG. 9B illustrates an example of the DRS burst configuration when the DRS unit size is one slot and the first SSB in one slot is transmitted. The DRS burst in this example is four consecutive DRS units, and the time length of the DRS burst is four slots. The transmission of the DRS burst is started from different timings according to the LBT result.

The position index may be given to the SSB transmission candidate position in the DRS transmission window. For example, when the transmission of the DRS burst starts from a position index 0, the SSBs corresponding to position indexes 0, 2, 4, and 6 are transmitted.

The UE may recognize the DRS burst configuration based on the DRS unit size, the number of DRS units, and the position index. In this case, the UE may recognize candidates of a plurality of DRS burst configurations including the DRS unit corresponding to the position index.

The UE may recognize the DRS burst configuration based on the DRS unit size, the number of DRS units, the position index, and bits (for example, ssb-PositionInBurst) in the MIB.

The UE may be notified of information indicating the position index of the SSB at a head of the DRS burst by the MIB (or the MIB and the sequence of DMRSs in the PBCH). The UE may recognize the DRS burst configuration (the frame starting position or the like) based on the DRS unit size, the number of DRS units, and the position index at the head of the DRS burst.

The number of bits used for at least one of the PDCCH configuration information for the SIB1 (pdcch-ConfigSIB1) and the SSB subcarrier offset information (ssb-SubcarrierOffset) at the NR-U target frequency may be smaller than the number of bits used for at least one of the pdcch-ConfigSIB1 and the ssb-SubcarrierOffset at the NR target frequency. The bits remaining due to the reduction in the number of bits may be used for at least one notification of the DRS unit size, the number of DRS units, and the transmission SSB information (information indicating which of the first and second SSBs in one slot is transmitted).

When one SSB is detected, the UE may determine the corresponding Type 0-PDCCH monitoring occasion. When the detected SSB is the first SSB in the slot, the UE may determine that the corresponding Type 0-PDCCH monitoring occasion is the head of the slot. When the DRS unit size is a half slot and the detected SSB is the second SSB in the slot, the UE may determine that the corresponding Type 0-PDCCH monitoring occasion is immediately before the SSB. When the DRS unit size is one slot and the detected SSB is the second SSB in the slot, the UE may determine that the corresponding Type 0-PDCCH monitoring occasion is the head of the slot. As described above, when the Type 0-PDCCH monitoring occasion is determined from the detected SSB, the number of bits of the pdcch-ConfigSIB1 can be reduced.

The number of bits of the pdcch-ConfigSIB1 at the NR-U target frequency may be smaller than the number of bits at the NR target frequency by fixing a Type 0-PDCCH CSS configuration at the NR-U target frequency by a specification.

The SSB subcarrier offset at the NR-U target frequency is fixed to 0 by a specification, or the granularity of the SSB subcarrier offset at the NR-U target frequency is coarser than the granularity at the NR target frequency. Thus, the number of bits of the ssb-SubcarrierOffset at the NR-U target frequency may be smaller than the number of bits at the NR target frequency.

At the NR-U target frequency, it is conceivable that a center frequency is adjusted to the channel (for example, 20 MHz bandwidth) of the coexistence system. As a result, the subcarrier offset may be set to zero.

According to the above Embodiment 2, the UE can recognize the information on the DRS burst configuration of the serving cell according to the detection of the SSB.

Embodiment 3

The UE may interpret the SSB position information (ssb-PositionInBurst) in the burst based on the DRS unit size.

The size of the ssb-PositionInBurst may be fixed regardless of the DRS unit size or the like.

When the maximum value of the number of DRS units is associated with the DRS unit size, the UE may be notified of the DRS burst configuration by the ssb-PositionInBurst.

At the NR-U target frequency, the first bit of the bitmap of the ssb-PositionInBurst may correspond to the DRS unit at the head of the actually transmitted DRS burst. The number of is in the bitmap of the ssb-PositionInBurst may be the number of DRS units.

For example, when the number of DRS units is four and the DRS unit size is a half slot, the bitmap of the ssb-PositionInBurst may be [1, 1, 1, 1, 0, 0, 0, 0]. For example, when the number of DRS units is eight and the DRS unit size is a half slot, the bitmap of the ssb-PositionInBurst may be [1, 1, 1, 1, 1, 1, 1, 1].

For example, when the number of DRS units is four, the DRS unit size is one slot, and the first SSB in the slot is transmitted, the bitmap of the ssb-PositionInBurst may be [1, 0, 1, 0, 1, 0, 1, 0]. For example, when the number of DRS units is four, the DRS unit size is one slot, and the second SSB in the slot is transmitted, the bitmap of the ssb-PositionInBurst may be [0, 1, 0, 1, 0, 1, 0, 1].

When the maximum value of the number of DRS units is fixed (for example, eight) regardless of the DRS unit size, the ssb-PositionInBurst at the NR-U target frequency may not be the bitmap. For example, the ssb-PositionInBurst at the NR-U target frequency may be information on the number of DRS units in the DRS burst (for example, 3 bits) and the DRS unit configuration (for example, the DRS unit size, the transmission SSB information, or the like). For example, the DRS unit configuration may indicate, by two bits, one of a case where the DRS unit size is one slot and the first SSB in one slot is used, a case where the DRS unit size is one slot and the second SSB in one slot is used, and a case where the DRS unit size is one slot.

When the maximum value of the number of DRS units is fixed (for example, eight) regardless of the DRS unit size, the ssb-PositionInBurst at the NR-U target frequency may be the bitmap. For example, the bitmap may indicate whether each of the plurality of DRS units corresponding to the DRS unit size notification of which is given is transmitted. For example, when the number of DRS units is six, the bitmap may be [1, 1, 1, 1, 1, 1, 0, 0] regardless of the DRS unit size.

According to the above Embodiment 3, the UE may be notified of the DRS burst configuration at the NR-U target frequency without increasing the size of the MIB as compared with the NR target frequency.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 10:
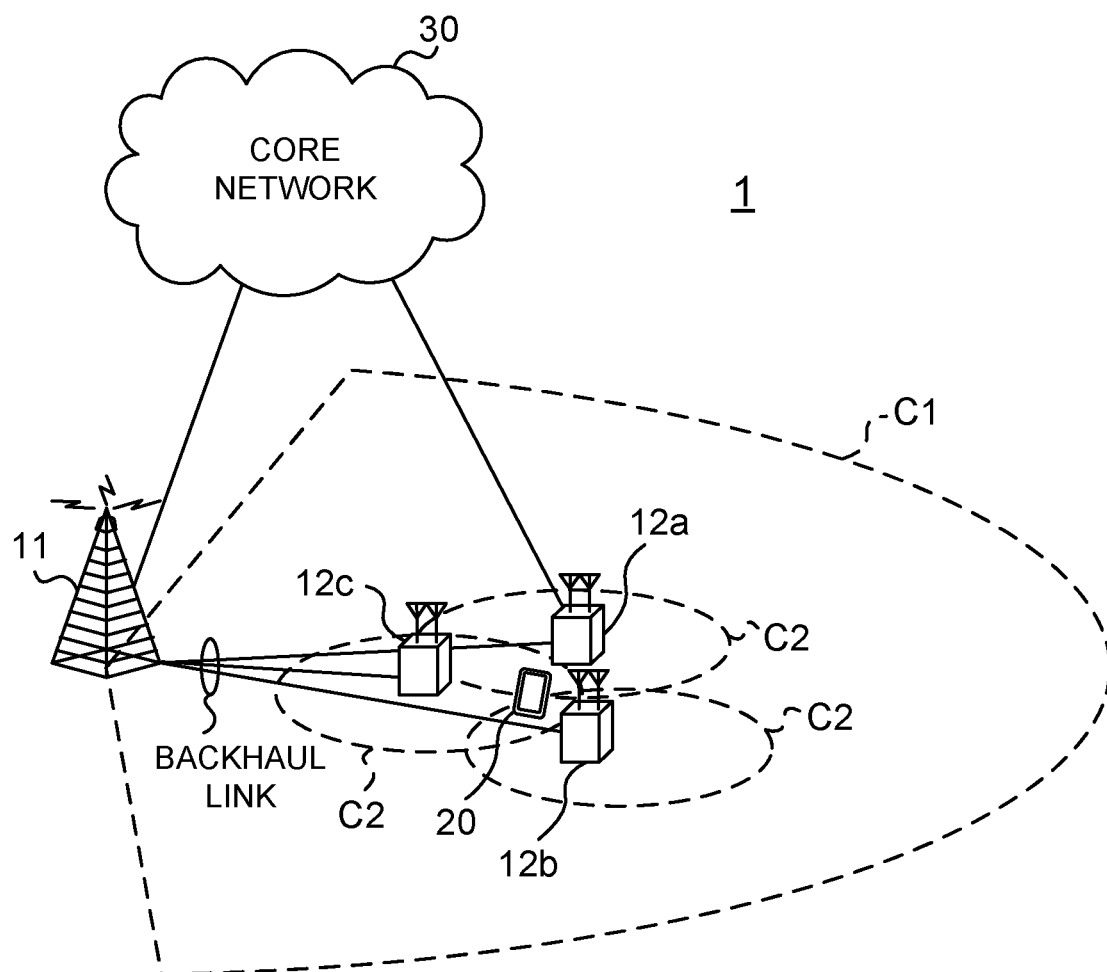
FIG. 10 is a diagram illustrating an example of a schematic configuration of a radio communication system according to one embodiment.

FIG. 10 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (Evolved Universal Terrestrial Radio Access (E-UTRA)) and NR (E-UTRA-NR Dual Connectivity (EN-DC)), dual connectivity between NR and LTE (NR-E-UTRA Dual Connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and, for example, FR1 may correspond to a frequency range higher than FR2.

Further, the user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by each user terminal 20, a physical broadcast channel (PBCH), a physical downlink control channel (PDCCH), or the like may be used.

Further, in the radio communication system 1, as an uplink channel, a physical uplink shared channel (PUSCH) shared by each user terminal 20, a physical uplink control channel (PUCCH), a physical random access channel (PRACH), or the like may be used.

User data, higher layer control information, and a system information block (SIB) and the like are transmitted by the PDSCH. The PUSCH may transmit user data, higher layer control information, and the like. Further, the PBCH may transmit a master information block (MIB).

The PDCCH may transmit lower layer control information. The lower layer control information may include, for example, downlink control information (DCI) including scheduling information of at least one of the PDSCH and the PUSCH.

Note that DCI that schedules the PDSCH may be referred to as DL assignment, DL DCI, or the like, and DCI that schedules the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a certain search space based on search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, Hybrid Automatic Repeat reQuest ACKnowledgement (HARQ-ACK), ACK/NACK, or the like), scheduling request (SR), and the like may be transmitted by the PUCCH. By means of the PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SS Block (SSB), and the like. Note that the SS, the SSB, or the like may also be referred to as a reference signal.

Further, in the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)".

Figure 11:
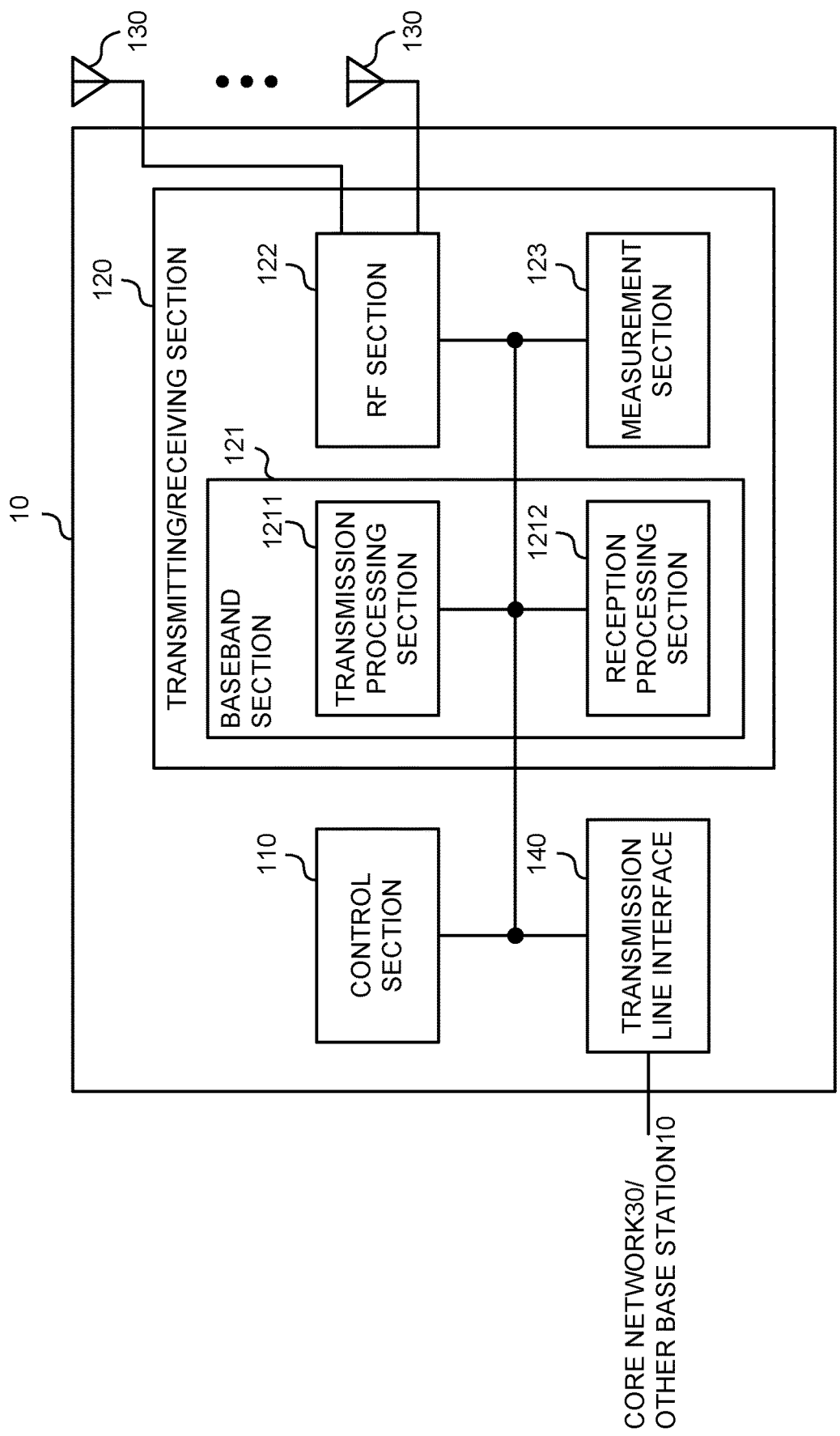
FIG. 11 is a diagram illustrating an example of a configuration of a base station according to one embodiment.

(Base station) FIG. 11 is a diagram illustrating an example of a configuration of the base station according to one embodiment. The base station 10 includes a control section 110, a transmission/reception section 120, a transmission/reception antenna 130, and a transmission line interface 140. Note that one or more of the control sections 110, one or more of the transmission/reception sections 120, one or more of the transmission/reception antennas 130, and one or more of the transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a control section, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmission/reception section 120, the transmission/reception antenna 130, and the transmission line interface 140. The control section 110 may generate data to be transferred as a signal, control information, a sequence, and the like, and may transfer the data, the control information, the sequence, and the like to the transmission/reception section 120. The control section 110 may perform call processing (such as configuration or release) of a communication channel, management of the state of the base station 10, and management of a radio resource.

The transmission/reception section 120 may include a baseband section 121, a radio frequency (RF) section 122, and a measurement section 123. The baseband section 121 may include a transmission processing section 1211 and a reception processing section 1212. The transmission/reception section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmission/reception section 120 may be constituted as an integrated transmission/reception section, or may be constituted by a transmission section and a reception section. The transmission section may be constituted by the transmission processing section 1211 and the RF section 122. The reception section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmission/reception section 120 may transmit the above-described downlink channel, synchronization signal, downlink reference signal, and the like. The transmission/reception section 120 may receive the above-described uplink channel, uplink reference signal, and the like.

The transmission/reception section 120 may form at least one of a Tx beam and a reception beam by using digital beam forming (for example, precoding), analog beam forming (for example, phase rotation), and the like.

The transmission/reception section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmission/reception section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmission/reception section 120 (RF section 122) may perform modulation to a radio frequency band, filtering processing, amplification, and the like on the baseband signal, and may transmit a signal in the radio frequency band via the transmission/reception antenna 130.

Meanwhile, the transmission/reception section 120 (RF section 122) may perform amplification, filtering processing, demodulation to a baseband signal, and the like on the signal in the radio frequency band received by the transmission/reception antenna 130.

The transmission/reception section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmission/reception section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), or a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmission section and the reception section of the base station 10 in the present disclosure may include at least one of the transmission/reception section 120 and the transmission/reception antenna 130.

(User Terminal)

Figure 12:
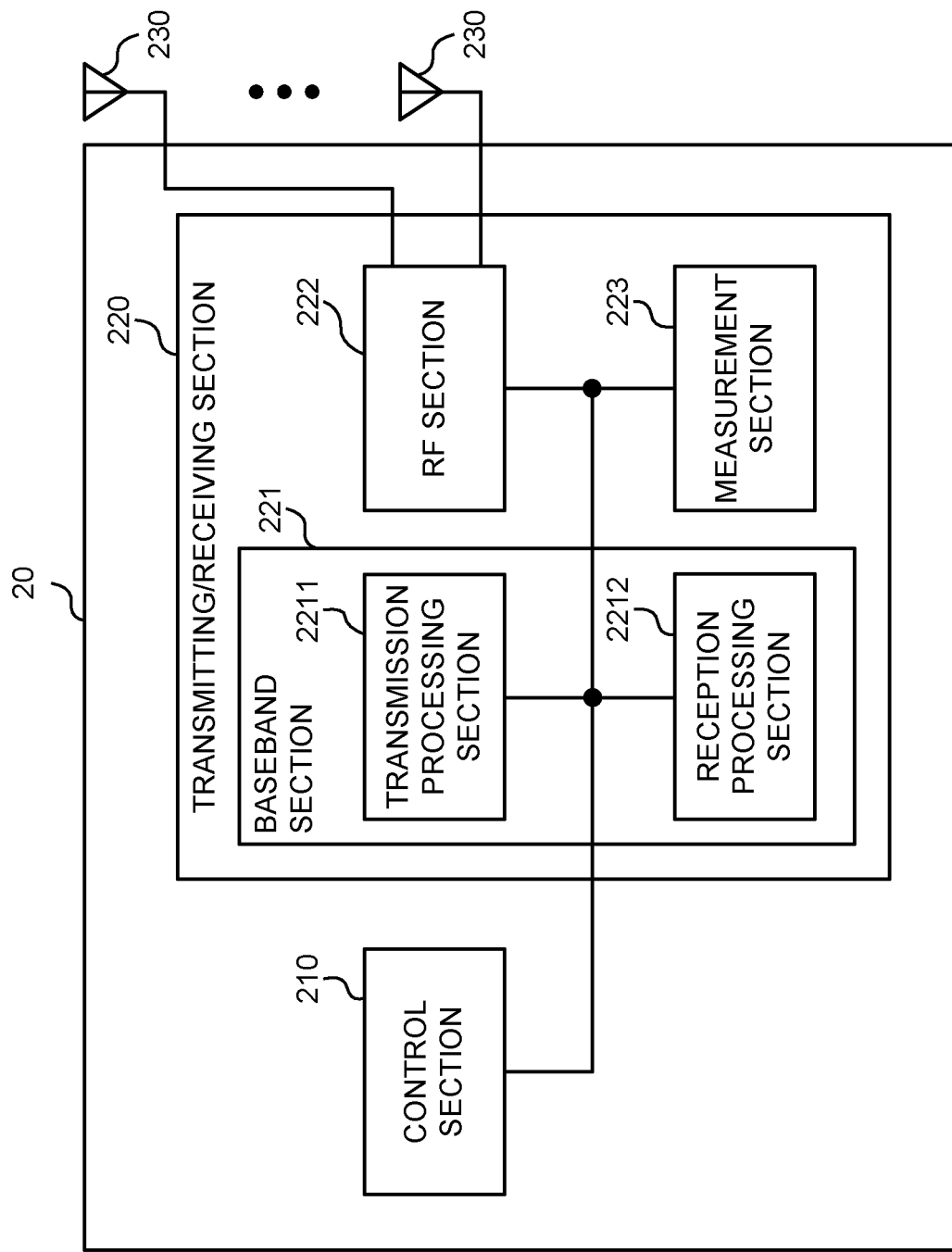
FIG. 12 is a diagram illustrating an example of a configuration of a user terminal according to one embodiment.

FIG. 12 is a diagram illustrating an example of a configuration of a user terminal according to one embodiment. The user terminal 20 includes a control section 210, a transmission/reception section 220, and a transmission/reception antenna 230. Note that one or more of the control sections 210, one or more of the transmission/reception sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be constituted by a control section, a control circuit, or the like, which is described based on common recognition in the technical field to which the present disclosure relates.

The control section 210 may control signal generation, mapping, and the like. The control section 210 may control transmission/reception, measurement, and the like using the transmission/reception section 220 and the transmission/reception antenna 230. The control section 210 may generate data to be transmitted as a signal, control information, a sequence, and the like, and may transfer the data, the control information, the sequence, and the like to the transmission/reception section 220.

The transmission/reception section 220 may include a baseband section 221, an RF section 222, and a measurement section 223. The baseband section 221 may include a transmission processing section 2211 and a reception processing section 2212. The transmission/reception section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmission/reception section 220 may be constituted as an integrated transmission/reception section, or may be constituted by a transmission section and a reception section. The transmission section may be constituted by the transmission processing section 2211 and the RF section 222. The reception section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmission/reception section 220 may receive the above-described downlink channel, synchronization signal, downlink reference signal, and the like. The transmission/reception section 220 may transmit the above-described uplink channel, uplink reference signal, and the like.

The transmission/reception section 220 may form at least one of a Tx beam and a reception beam by using digital beam forming (for example, precoding), analog beam forming (for example, phase rotation), and the like.

The transmission/reception section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmission/reception section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmission/reception section 220 (transmission processing section 2211) may perform DFT processing as the transmission processing in order to transmit the channel using a DFT-s-OFDM waveform. When transform precoding is not enabled for a channel (for example, PUSCH), the transmission/reception section 220 (transmission processing section 2211) may not perform DFT processing as the transmission processing.

The transmission/reception section 220 (RF section 222) may perform modulation to a radio frequency band, filtering processing, amplification, and the like on the baseband signal, and may transmit a signal in the radio frequency band via the transmission/reception antenna 230.

Meanwhile, the transmission/reception section 220 (RF section 222) may perform amplification, filtering processing, demodulation to a baseband signal, and the like on the signal in the radio frequency band received by the transmission/reception antenna 230.

The transmission/reception section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmission/reception section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmission section and the reception section of the user terminal 20 in the present disclosure may be constituted by at least one of the transmission/reception section 220, the transmission/reception antenna 230, and the transmission line interface 240.

Furthermore, the transmission/reception section 220 may receive the synchronization signal block (SS/PBCH block) including the synchronization signal (SS) and the broadcast channel (PBCH) at a frequency (for example, an NR-U target frequency) to which the sensing of the channel before the transmission is applied.

The control section 210 may determine at least one of a configuration of a first signal (for example, the DRS and the DRS unit) including the synchronization signal block, and a downlink control channel (for example, RMSI PDCCH) and a downlink shared channel (for example, RMSI PDSCH) that are quasi co-located (QCL) with the synchronization signal block and a configuration of a second signal (for example, DRS burst) including the first signal in a specific period (for example, DRS unit size×number of DRS units) based on the synchronization signal block.

The control section 210 may determine the number of symbols of a control resource set (for example, CORESET #0) for the downlink control channel based on the broadcast channel, and may determine a time length (for example, the DRS unit size) of the first signal based on the number of symbols (Embodiment 1).

The control section 210 may determine whether the time length of the first signal is a half slot or one slot (Embodiment 1).

The control section 210 may determine the number of consecutive first signals (for example, the number of DRS units) in the second signal based on the broadcast channel (Embodiment 2).

The control section 210 may determine the configuration of the second signal based on a bitmap (for example, ssb-PositionInBurst) in the broadcast channel and the time length of the first signal (Embodiment 3).

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, wireless, or the like, for example) and using these plural apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration section) that causes transmission to function may be referred to as a transmitting unit, a transmitter, and the like. In any case, as described above, the implementation method is not particularly limited.

Figure 13:
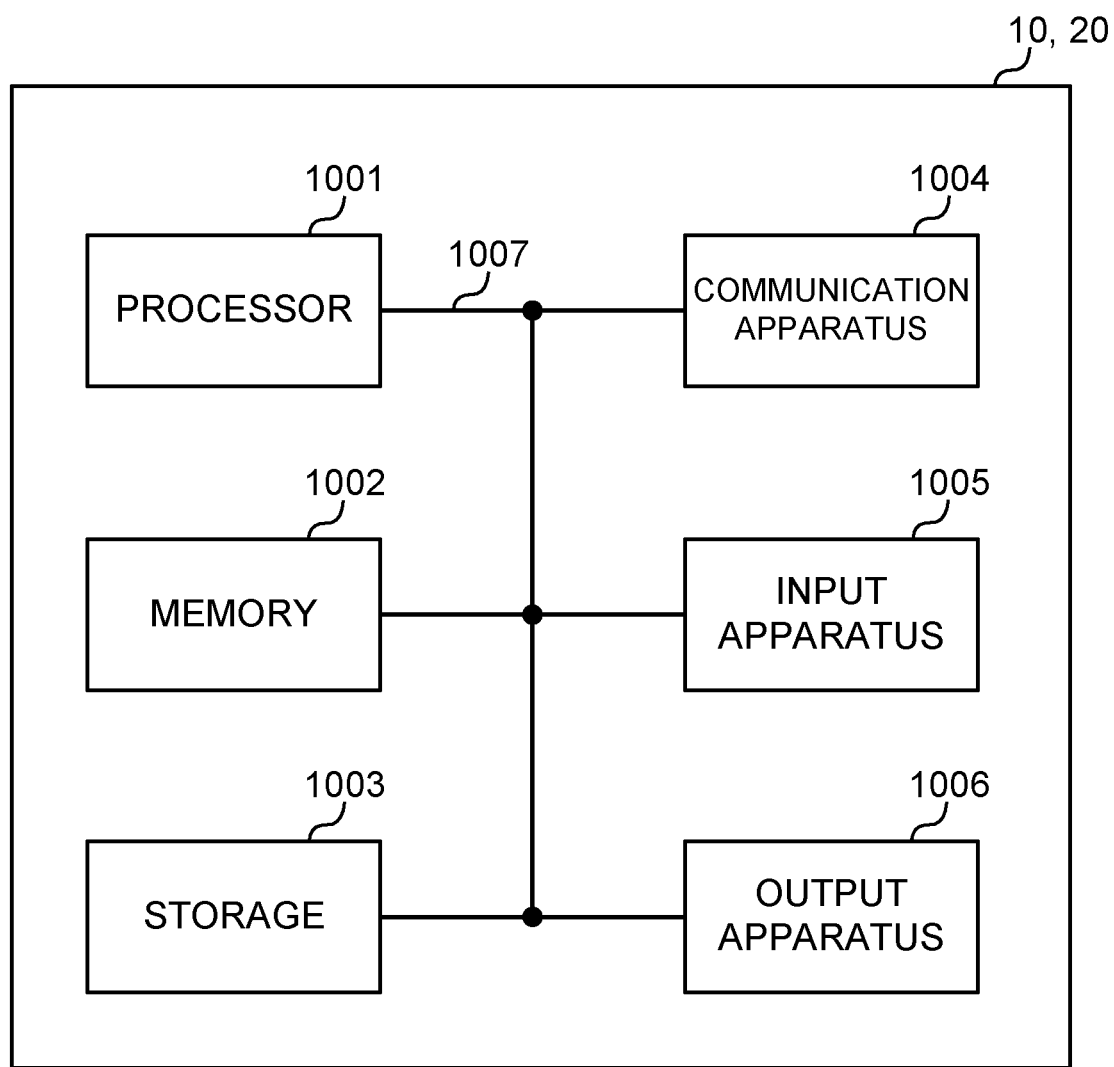
FIG. 13 is a diagram illustrating an example of a hardware structure of a base station and a user terminal according to one embodiment.

For example, the base station, the user terminal, and the like according to one embodiment of the present disclosure may function as a computer that executes the processing of the radio communication method of the present disclosure. FIG. 13 is a diagram illustrating an exemplary hardware structure of a base station and a user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be configured to include one or a plurality of apparatuses illustrated in the drawings, or may be configured without including some apparatuses.

For example, although only one processor 1001 is illustrated, a plurality of processors may be provided. Further, the processing may be executed by one processor, or the processing may be executed in sequence or using other different methods simultaneously by two or more processors. Note that the processor 1001 may be implemented with one or more chips.

Each of functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 may control the whole computer by, for example, running an operating system. As the processor 1001, provided may be a central processing unit (CPU) including an interface with peripheral equipment, a control device, an operation device, a register, and the like. For example, at least a part of the above-described control section 110 (210), transmission/reception section 120 (220), and the like may be implemented by the processor 1001.

Furthermore, the processor 1001 reads programs (program codes), software modules, or data, from at least one of the storage 1003 and the communication apparatus 1004, into the memory 1002, and executes various processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be constituted by, for example, at least one of a read only memory (ROM), an erasable programmable ROM (EPROM), an electrically EPROM (EEPROM), a random access memory (RAM) and/or other appropriate storage media. The memory 1002 may be referred to as a "register", a "cache", a "main memory (primary storage apparatus)", and the like. The memory 1002 can store a program (program code), a software module, and the like, which are executable for implementing the radio communication method according to one embodiment of the present disclosure.

The storage 1003 is a computer-readable recording medium, and may be constituted by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as "secondary storage apparatus".

The communication apparatus 1004 is hardware (transmitting/receiving device) for allowing inter-computer communication by using at least one of a wired network and a wireless network, and may be referred to as, for example, a network device, a network control section, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmission/reception section 120 (220), the transmission/reception antenna 130 (230), and the like described above may be implemented by the communication apparatus 1004. The transmission/reception section 120 (220) may be implemented by physically or logically separating a transmission section 120a (220a) and a reception section 120b (220b) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, and the like). Note that the input apparatus 1005 and the output apparatus 1006 may be provided in an integrated structure (for example, a touch panel).

Furthermore, these apparatuses, including the processor 1001, the memory 1002 and so on are connected by the bus 1007 so as to communicate information. The bus 1007 may be formed with a single bus, or may be formed with buses that vary between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be read interchangeably. Further, the signal may be a message. A reference signal can be abbreviated as an "RS", and may be referred to as a "pilot", a "pilot signal", and the like, depending on which standard applies. Furthermore, a component carrier (CC) may be referred to as a cell, a frequency carrier, a carrier frequency, and the like.

A radio frame may include one or a plurality of periods (frames) in a time domain. Each of the one or plurality of periods (frames) constituting the radio frame may be referred to as a "subframe". Furthermore, a subframe may include one or a plurality of slots in the time domain. A subframe may be a fixed time length (for example, 1 ms) that is not dependent on numerology.

Here, numerology may be a communication parameter applied to at least one of transmission and reception of a certain signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

A slot may be constituted by one or a plurality of symbols in the time domain (orthogonal frequency division multiplexing (OFDM) symbols, single carrier frequency division multiple access (SC-FDMA) symbols, and the like). In addition, a slot may be a time unit based on numerology.

A slot may include a plurality of mini slots. Each mini slot may include one or a plurality of symbols in the time domain. Further, the mini slot may be referred to as a "subslot". Each mini slot may include fewer symbols than a slot. PDSCH (or PUSCH) transmitted in a time unit larger than a mini slot may be referred to as PDSCH (PUSCH) mapping type A. A PDSCH (or PUSCH) transmitted using a mini slot may be referred to as PDSCH (PUSCH) mapping type B.

A radio frame, a subframe, a slot, a mini slot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of contiguous subframes may be referred to as TTI, or one slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot", and so on, instead of a "subframe".

Here, a TTI refers to the minimum time unit of scheduling in radio communication, for example. For example, in the LTE system, a base station performs scheduling to allocate radio resources (a frequency bandwidth and transmission power that can be used in each user terminal and the like) to each user terminal in TTI units. Note that the definition of TTIs is not limited to this.

The TTI may be the transmission time unit of channel-encoded data packets (transport blocks), code blocks, codewords, or the like, or may be the unit of processing in scheduling, link adaptation, or the like. Note that, when the TTI is given, a time interval (for example, the number of symbols) to which the transport block, code block, codeword, or the like is actually mapped may be shorter than the TTI.

Note that, when one slot or one mini slot is referred to as a "TTI", one or more TTIs (that is, one or multiple slots or one or more mini slots) may be the minimum time unit of scheduling. In addition, the number of slots (the number of mini slots) to constitute this minimum time unit of scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (for example, a normal TTI, a subframe, or the like) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of contiguous subcarriers in the frequency domain. The number of subcarriers included in the RB may be the same regardless of the numerology, and may be twelve, for example. The number of subcarriers included in the RB may be determined based on the numerology.

In addition, an RB may include one or more symbols in the time domain, and may be one slot, one mini slot, one subframe or one TTI in length. One TTI, one subframe, and the like each may be constituted by one or a plurality of resource blocks.

Note that one or a plurality of RBs may be referred to as a physical resource block (PRB (Physical RB)), a subcarrier group (SCG (Sub-Carrier Group)), a resource element group (REG), a PRB pair, an RB pair, or the like.

Furthermore, a resource block may be constituted by one or a plurality of resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

The BWP may include BWP for UL (UL BWP) and BWP for DL (DL BWP). For the UE, one or a plurality of BWPs may be configured within one carrier.

At least one of the configured BWPs may be active, and it may not be assumed that the UE transmits and receives a given signal/channel outside the active BWP. Note that a "cell", a "carrier", or the like in the present disclosure may be replaced with the "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Further, the information, parameters, and the like described in the present disclosure may be represented using absolute values or relative values with respect to given values, or may be represented using other corresponding information. For example, a radio resource may be specified by a given index.

The names used for parameters and the like in the present disclosure are in no respect limiting. Furthermore, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signal, and the like to be input and/or output can be overwritten, updated, or appended. The output information, signal, and the like may be deleted. The information, signals, and so on that are input may be transmitted to other apparatuses.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, and the like. Further, a notification of MAC signaling may be given using, for example, MAC control elements (MAC control elements (CEs)).

In addition, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software", "firmware", "middleware", "microcode", or "hardware description language" or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

In addition, software, commands, information and so on may be transmitted and received via communication media.

For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "Quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or a plurality of (for example, three) cells. When a base station accommodates a plurality of cells, the entire coverage area of the base station can be partitioned into a plurality of smaller areas, and each smaller area can provide communication service through base station subsystems (for example, indoor small base stations (remote radio heads (RRHs))). The term "cell" or "sector" refers to a part or the whole of a coverage area of at least one of a base station and a base station subsystem that perform a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmitting apparatus, a receiving apparatus, a radio communication apparatus, and the like. Note that at least one of the base station and the mobile station may be a device mounted on a moving body, a moving body itself, and the like. The moving body may be a transportation (for example, a car, an airplane and the like), an unmanned moving body (for example, a drone, an autonomous car, and the like), or a (manned or unmanned) robot. Note that at least one of the base station and the mobile station also includes a device that does not necessarily move during a communication operation. For example, at least one of the base station and the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-mentioned base station 10. In addition, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20

In the present disclosure, the operation performed by the base station may be performed by an upper node thereof in some cases. In a network including one or a plurality of network nodes with base stations, it is clear that various operations performed for communication with a terminal can be performed by a base station, one or a plurality of network nodes (examples of which include but are not limited to mobility management entity (MME) and serving-gateway (S-GW)) other than the base station), or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined (for example, a combination of LTE or LTE-A and 5G) and applied.

The phrase "based on" as used in the present disclosure does not mean "based on only", unless otherwise specified. In other words, the phrase "based on" means both "based only on" and "based at least on".

Any reference to an element using designations such as "first" and "second" used in the present disclosure does not generally limit the amount or order of these elements. These designations may be used in the present disclosure only for convenience, as a method for distinguishing between two or more elements. In this way, reference to the first and second elements does not imply that only two elements may be employed, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory), and so on.

In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

Further, "determining" may be replaced with "assuming", "expecting", "considering", and the like.

The "maximum transmission power" described in the present disclosure may mean a maximum value of transmission power, the nominal UE maximum transmit power, or the rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the phrase may mean that "A and B are different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Therefore, the description in the present disclosure is provided for the purpose of describing examples, and thus, should by no means be construed to limit the invention according to the present disclosure in any way.

The invention claimed is:

1. A terminal comprising:
a receiving section that receives a synchronization signal block among one or more synchronization signal blocks included in a burst for discovery in a spectrum in which a channel access procedure is performed; and
a control section that obtains a master information block in the synchronization signal block,
wherein the burst includes the one or more synchronization signal blocks, one or more physical downlink shared channel (PDSCHs), and one or more control resource sets (CORESETs) for scheduling the one or more PDSCHs,
each synchronization signal block includes a synchronization signal and a physical broadcast channel,
each PDSCH includes a system information block,
wherein the control section determines an index related to quasi co-location relation relationship of the synchronization signal block based on the master information block and a demodulation reference signal in the synchronization signal block, and
wherein the receiving section receives a bitmap indicating a time domain position of the one or more synchronization signal blocks, and a bit after the number of the one or more synchronization signal blocks is zero.

2. The terminal according to claim 1, wherein the receiving section receives a physical downlink control channel (PDCCH) quasi co-located with the specifie synchronization signal block.

3. The terminal according to claim 2, wherein when the number of the one or more synchronization signal blocks is 1, the number of PDCCHs in a slot is 1.

4. The terminal according to claim 1, wherein when the number of the one or more synchronization signal blocks is 1, the number of PDCCHs in a slot is 1.

5. A radio communication method for a terminal, the method comprising:
receiving a synchronization signal block among one or more synchronization signal blocks included in a burst for discovery in a spectrum in which a channel access procedure is performed; and
obtaining a master information block in the synchronization signal block,
wherein the burst includes the one or more synchronization signal blocks, one or more physical downlink shared channel (PDSCHs), and one or more control resource sets (CORESETs) for scheduling the one or more PDSCHs,
each synchronization signal block includes a synchronization signal and a physical broadcast channel,
each PDSCH includes a system information block,
wherein the terminal determines an index related to quasi co-location relation relationship of the synchronization signal block based on the master information block and a demodulation reference signal in the synchronization signal block, and
wherein the terminal receives a bitmap indicating a time domain position of the one or more synchronization signal blocks, and a bit after the number of the one or more synchronization signal blocks is zero.

6. A base station comprising:
a transmitting section that transmits a burst for discovery, the burst including the one or more synchronization signal blocks, one or more physical downlink shared channel (PDSCHs), and one or more control resource sets (CORESETs) for scheduling the one or more PDSCHs; and a control section that includes a synchronization signal and a physical broadcast channel in each synchronization signal block, and includes a system information block in each PDSCH, wherein an index related to quasi co-location relation relationship of the synchronization signal block in the one or more synchronization signal blocks is based on the master information block in the synchronization signal block and a demodulation reference signal in the synchronization signal block, and wherein the transmitting section transmits a bitmap indicating a time domain position of the one or more synchronization signal blocks, and a bit after the number of the one or more synchronization signal blocks is zero.

7. A system comprising a terminal and a base station, wherein the terminal comprises:
a receiving section that receives a synchronization signal block among one or more synchronization signal blocks included in a burst for discovery in a spectrum in which a channel access procedure is performed; and a control section that obtains a master information block in the synchronization signal block, the base station transmits the burst,
the burst includes the one or more synchronization signal blocks, one or more physical downlink shared channel (PDSCHs), and one or more control resource sets (CORESETs) for scheduling the one or more PDSCHs, each synchronization signal block includes a synchronization signal and a physical broadcast channel, and each PDSCH includes a system information block, wherein the control section determines an index related to quasi co-location relation relationship of the synchronization signal block based on the master information block and a demodulation reference signal in the synchronization signal block, and wherein the receiving section receives a bitmap indicating a time domain position of the one or more synchronization signal blocks, and a bit after the number of the one or more synchronization signal blocks is zero.

* * * * *